US012793195B2

(12) United States Patent
Ngadi et al.

(10) Patent No.: US 12,793,195 B2
(45) Date of Patent: Nov. 10, 2026

(54) SYSTEM, METHOD AND DEVICE FOR MEAT MARBLING ASSESSMENT

(71) Applicant: MATRIXSPEC SOLUTIONS INC., Baie D'Urfe (CA)

(72) Inventors: Michael Ngadi, Pierrefonds (CA); Li Liu, Saint-Anne-de-Bellevue (CA); Imran Ahmed, Calgary (CA); Zhaohui Gu, Guelph (CA); Senthilkumar Thiruppathi, Lethbridge (CA); Mahmoud Derakhshan Horeh, Saint Laurent (CA)

(73) Assignee: MATRIXSPEC SOLUTIONS INC., Baie D'Urfe (CA)

( * ) Notice: Subject to any disclaimer, the term of this patent is extended or adjusted under 35 U.S.C. 154(b) by 574 days.

(21) Appl. No.: 18/013,422

(22) PCT Filed: Jul. 6, 2021

(86) PCT No.: PCT/CA2021/050922
§ 371 (c)(1),
(2) Date: Dec. 28, 2022

(87) PCT Pub. No.: WO2022/006665
PCT Pub. Date: Jan. 13, 2022

(65) Prior Publication Data

US 2023/0316481 A1 Oct. 5, 2023

Related U.S. Application Data

(60) Provisional application No. 63/048,510, filed on Jul. 6, 2020.

(51) Int. Cl.
*G06T 7/00* (2017.01)
*G06T 7/11* (2017.01)

(52) U.S. Cl.
CPC .............. *G06T 7/0002* (2013.01); *G06T 7/11* (2017.01); *G06T 2207/10024* (2013.01); *G06T 2207/30128* (2013.01)

(58) Field of Classification Search
CPC ..................... G06T 7/0002; G06T 7/11; G06T 2207/10024; G06T 2207/30128;
(Continued)

(56) References Cited

U.S. PATENT DOCUMENTS 5,668,634 A 9/1997 Newman
6,198,834 B1 3/2001 Belk
(Continued)

FOREIGN PATENT DOCUMENTS

CN 201508328 U * 6/2010
CN 105567801 A * 5/2016
(Continued)

OTHER PUBLICATIONS

Aamir et al, "MARS spectral molecular imaging of lamb tissue: data collection and image analysis." Journal of Instrumentation 9.02 (2014): P02005, pp. 1-11 (Year: 2014).*
(Continued)

*Primary Examiner* — Emily C Terrell
*Assistant Examiner* — Dominique James
(74) *Attorney, Agent, or Firm* — Bennett Jones LLP; Lorelei G. Graham

(57) ABSTRACT

A system and method for assessing a marbling of a meat sample are provided. The system comprises at least one processor and a memory comprising instructions which, when executed by the processor, configure the processor to perform the method. The method comprises obtaining an image of a meat sample, identifying a muscle of interest (MOI) of the meat sample, segmenting an area of interest (AOI) in the MOI where the AOI in the MOI comprises a
(Continued)

region of interest (ROI) of the image, detecting a number of marbling pixels in the ROI of the image, and determining a marbling score comprising a ratio of the number of marbling pixels and the total number of pixels in the ROI of the image. The meat sample is one of a chop, a slice, a steak, or a whole loin.

20 Claims, 39 Drawing Sheets

(58) Field of Classification Search
CPC ..... G06T 2200/24; G06T 7/136; G06T 7/155; G01N 33/12
See application file for complete search history.

(56) References Cited

U.S. PATENT DOCUMENTS

| | | | | |
|---|---|---|---|---|
| 8,351,655 B2 * | 1/2013 | Hwang | G01N 33/12 345/611 |
| 8,494,226 B2 | 7/2013 | Wilson | |

FOREIGN PATENT DOCUMENTS

| | | | | | |
|---|---|---|---|---|---|
| CN | 105701805 A | * | 6/2016 | G06T 7/0004 |
| CN | 110197232 A | * | 9/2019 | G06K 9/40 |
| CN | 112634274 B | | 6/2021 | |
| JP | 2007306435 A | * | 11/2007 | G09G 5/026 |
| JP | 2008039610 A | | 2/2008 | |
| KR | 101594666 B1 | * | 2/2016 | |
| WO | 2014050168 A1 | | 4/2014 | |

OTHER PUBLICATIONS

You et al. "A novel chicken meat quality evaluation method based on color card localization and color correction." IEEE Access 8 (2020): 170093-170100. (Year: 2020).*
International Search Report issued on Nov. 3, 2021 for PCT/CA2021/050922.
Liu, J. H., Computer vision system as a tool to estimate pork marbling, North Dakota State University of Agriculture and Applied Science, Fargo, North Dakota, Jun. 2017.
Liu, L. et al., Objective determination of pork marbling scores using the wide line detector, Journal of Food Engineering 110 (2012) 497-504.
Huang, H. et al., Prediction of pork marbling scores using pattern analysis techniques, Food Control 31 (2013) 224-229.
Jinglu Tan: "Meat quality evaluation by computer vision", Journal of Food Engineering, vol. 61, No. 1, 2004, pp. 27-35, XP055820427.

* cited by examiner

330

(b)

330

(a)

1110

(a) original image

1120

(b) segmented ROI

1130

(c) detected marblings

1140

(d) binaralized marblings

1400

1910

1920

1930

1940

1950

1960

2030

2040

2070

2110

2120

2130

2140

2140

SYSTEM, METHOD AND DEVICE FOR MEAT MARBLING ASSESSMENT

CROSS REFERENCE TO RELATED APPLICATIONS

This application is a national stage entry of PCT/CA2021/050922 filed Jul. 6, 2021, which claims the benefit of and priority to U.S. provisional application No. 63/048,510 filed Jul. 6, 2020, the contents of all of which are hereby incorporated by reference.

FIELD

The present disclosure generally relates to imaging, and in particular to a system, method and device for meat marbling assessment.

INTRODUCTION

Marbling is the intermingling of fat with lean in the muscle and is regarded in some markets as an important attribute of the pork quality. Marbling in pork contributes to the juiciness and flavor of the meat and may also have a positive effect on its tenderness. Since consumers value color and marbling when making purchasing decisions, the United States Department of Agriculture (USDA) used National Pork Producers Council (NPPC) visual color and marbling as criteria for a proposed quality grading system where darker chops with greater marbling were valued over lighter chops with less marbling. Similarly, an official Canadian Pork Quality Standards of Canadian Pork International (CPI) which include marbling scores was recently released as a measurement tool to differentiate Canadian pork. The tool measures pork quality beyond traditional carcass yield and fat cover and provides unique mechanism to establish quantifiable points of differentiation; enabling the industry to deliver the right product for the right market segment and thereby gain competitive advantage over competitors. The NPPC pork marbling standard depicts a chart with seven grades from 1.0 (devoid) to 6.0 and 10.0 (abundant) which also represent an estimation of the intramuscular fat content of the loin eye muscle. The CPI Standards also includes seven marbling score categories (from 0 to 6) representing a wide cross selection of Canadian pork meat quality attributes. The standards are reproduced on a hand held grading ruler printed in full colour on 16-point food grade polyvinyl chloride (PVC) plastic. In the pork industry, visual assessment of marbling scores is currently widely used and conducted by experienced assessors to compare marbling levels of meat with the standardized chart system. However, such subjective procedure can be difficult and unreliable and has poor repeatability of results. In addition, the current practice of marbling score assessment involves cutting the whole loin between the 3rd and 4th last ribs for visual assessment which results in decreases of commercial values. Therefore, availability of objective, non-destructive and rapid assessment of marbling scores for a pork chop and a whole loin would be an asset for the meat industry. Such technology could be used to sort out the primal cuts (e.g., the whole pork loin) or pieces of meat (e.g., pork chops) on-line or at-line, remove poor quality product from discerning markets, and select animals on the basis of meat quality to guarantee product quality. Thus, an automatic marbling score assessment system/device that is able to operate with high accuracy and high speed would enhance the operation of meat processors with better productivity, repeatability, cost effectiveness and quality control.

SUMMARY

In accordance with an aspect, there is provided a system for assessing marblings of a meat sample that can be a chop or a whole loin. The system comprises at least one processor and a memory comprising instructions which, when executed by the processor, configure the processor to obtain an image of a meat sample, identify a muscle of interest (MOI) of the image, segment an area of interest (AOI) within the MOI where the AOI within the MOI comprises a region of interest (ROI) of the sample in the image, detect a number of marbling pixels in the ROI of the image, and determine a marbling score based on the statistics of the detected marblings such as a ratio of the number of marbling pixels and the total number of pixels in the ROI of the image. In some embodiments, marbling score may be based, in part, on the distribution of the marblings in the ROI of the image. The meat sample is one of a chop, a slice, a steak, or a whole loin.

In accordance with another aspect, there is provided a method of assessing a marbling of a meat sample. The method comprises obtaining an image of a meat sample, identifying a muscle of interest (MOI) (e.g., from bones, intermuscular fat, surrounding and connective tissues, and other muscles in the image, especially when multiple main muscles present in the meat sample image, segmenting an area of interest (AOI) within the MOI where the AOI within the MOI comprises a region of interest (ROI) of the sample in the image, detecting a number of marbling pixels in the ROI of the image, and determining a marbling score comprising a ratio of the number of marbling pixels and the total number of pixels in the ROI of the image. In some embodiments, marbling score may be based, in part, on the distribution of the marblings in the ROI of the image. The meat sample is one of a chop, a slice, a steak, or a whole loin.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
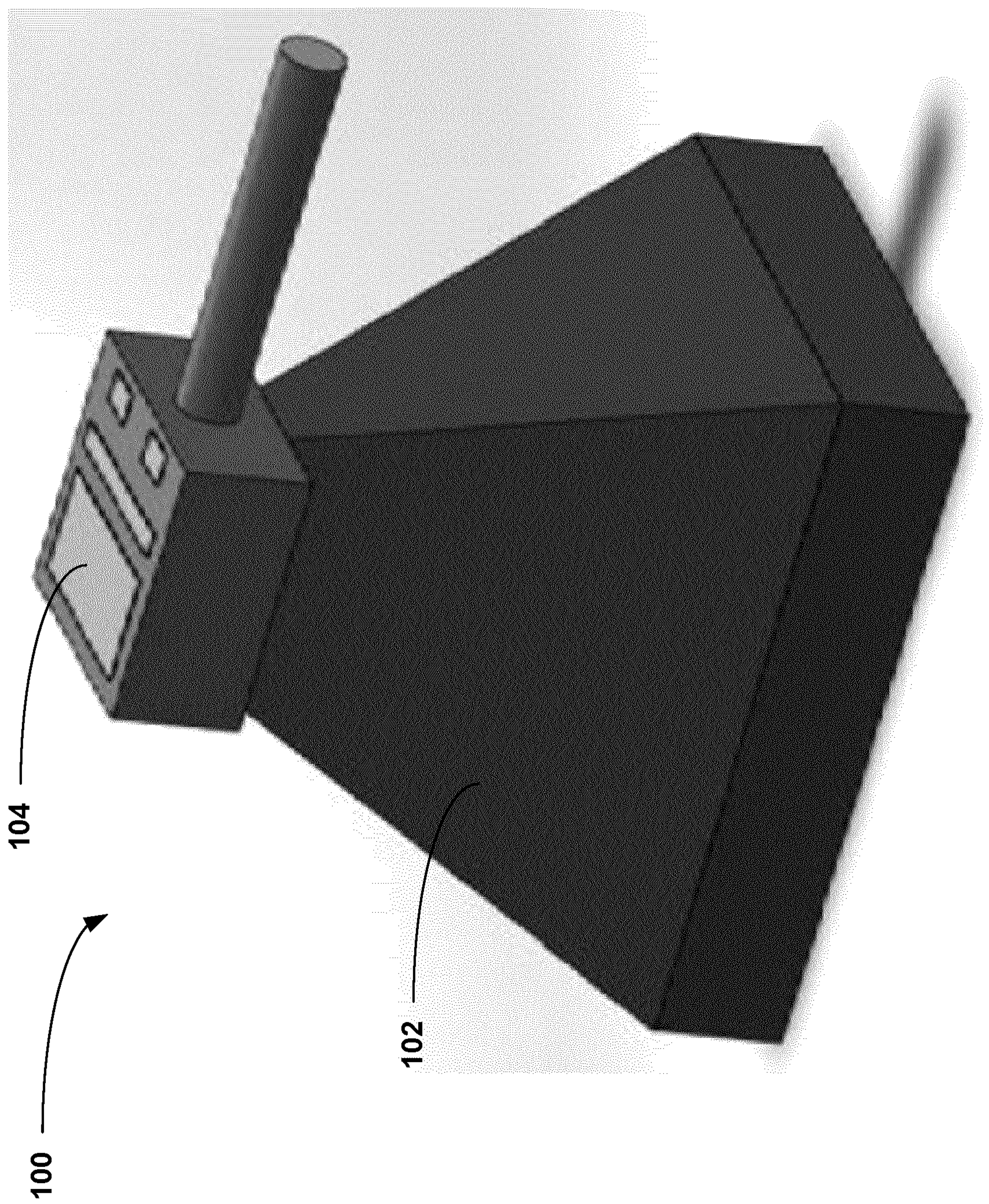
FIG. 1 illustrates an example of a device for assessing marbling of meat, in accordance with some embodiments.

Embodiments of methods, systems, and apparatus are described through reference to the drawings. Applicant notes that the described embodiments and examples are illustrative and non-limiting. Practical implementation of the features may incorporate a combination of some or all of the aspects, and features described herein should not be taken as indications of future or existing product plans.

Examples of methods and systems for the assessment of meat marbling is described herein. While many examples are provide herein with respect to pork, it should be understood that the teachings may also apply to other types of meat, including beef/veal, goat/lamb, etc.

Some authors have attempted to use imaging to assess marbling. These authors have mostly imaged a slab or chop and not on the entire meat (loin) surface. In these works, image analysis was applied to simply differentiate the meat chop from its image background and further to identify fat streaks on the segmented chops. This method normally fails to accurately estimate marbling. Another important short coming of previous work is that there is no differentiation of the different muscle or intermuscular fat groups in the chop. In reality, marbling is really the intramuscular fat deposits in a muscle and its assessment should consider specific muscle on a chop or on the entire loin surface.

Studies on pork marbling assessment have been conducted in laboratories, including using the hyperspectral imaging (HSI) technique (in the 400-1000 nanometres range) to determine marbling scores of pork. The images of samples at 661 nanometres (nm) which had the best contrast between lean meat and marbling were selected to estimate the marbling scores by computing their angular second moment (ASM) values. Their results showed that ASM could successfully discriminate the marbling scores of pork except for the standard score 10.0. However, the predicted results were higher than those obtained subjectively with an error around 1.0. Improvements were made by considering marblings as kind of line patterns which were extracted using the wide line detector (WLD) technique. The proportion of marblings (PM) obtained using the WLD analysis on digital color images of marbling standards was applied to determine marbling scores. Only three wavelengths at 720 nm (red), 580 nm (green) and 460 nm (blue) were used to calculate PM values for pork samples. The techniques allowed improved detection of marbling not only for the red samples (Reddish, Firm, and Non-exudative (RFN) and Reddish, Soft and Exudative (RSE) quality grades, with typically good contrast) but also for the more difficult pale samples (Pale, Soft and Exudative (PSE) and Pale, Firm and Non-exudative (PFN) quality groups) which traditionally have presented difficulty in assessing marbling due to poor contrast and light reflective problems. Thus, the work showed the high potential of using the WLD technique for developing an automatic marbling score assessment system. Later, the work was further extended on digital red/green/blue (RGB) images of fresh pork chops and compared assessment of pork marbling using the WLD and an image texture extraction technique based on an improved grey-level co-occurrence matrix (GLCM). Unlike the earlier work, pork sample image features were extracted from the red, green and blue channels as well the combined RGB channels. The results demonstrated that the WLD-based technique performed better than the GLCM-based technique for marbling score determination. The prediction results of a multiple linear model which was established based on all channels confirmed that the combined RGB channels was suitable for predicting pork marbling scores. The results also showed that the green channel had strong predictive ability for pork marbling score. This implies that a simple digital colour imaging system could be designed and used for marbling scores assessment using the WLD technique.

In some embodiments, a smart hand-held device (e.g., a Marbling Meter or marbling assessment device) may be used to objectively and automatically assess meat (including pork) marbling scores of a chop, slice or cut, or a whole loin in real-time. In some embodiments, this device has been designed and calibrated to match different standards such as the US (NPPC) and Canadian (CPI) standards. The Marbling Meter design will be described in detail below. It should be understood that the term Marbling Meter used herein refers to a marbling assessment device.

In some embodiments, the Marbling Meter is a handheld device that can automatically assess marbling score of a meat sample in real-time. FIG. 1 illustrates an example of a device 100 for assessing marblings of meat, in accordance with some embodiments. This portable device 100 (e.g., Marbling Meter), can take an image (e.g., an RGB, hyperspectral, greyscale or other type of image) of meat samples, either cross-sectional surfaces of chops, slices or cuts, or the outer surfaces of whole loins, in a uniform illumination environment and show the predicted marbling score according to a selected standard within seconds. The outer shell 102 of the portable device 100 encloses the meat sample and a light source (e.g., a light-emitting diode (LED), quartz tungsten halogen (QTH), incandescent, fluorescent, etc.) located within the outer shell 102 that provides uniform illumination environment. A highly sensitivity camera (that can be CCD, CMOS, digital camera, hyperspectral imaging camera, etc.) is mounted on top of the outer shell and enclosed by a case which has a screen 104 on top to display the predicted marbling scores.

The device 100 may comprise a hardware system and a software system. The hardware system defines the imaging environment, provides the calculation capacity, and enables the human machine interface. The software system allows automatic region of interest (ROI) segmentation (including muscle of interest (MOI) identification and area of interest (AOI) segmentation within the MOI), marbling detection and marbling score calculation. As used herein, the 'ROI segmentation of a meat sample image' comprises the MOI identification in the meat image and the AOI segmentation within the identified MOI. Accordingly, the ROI of a meat sample means the AOI in a MOI.

Figure 2A:
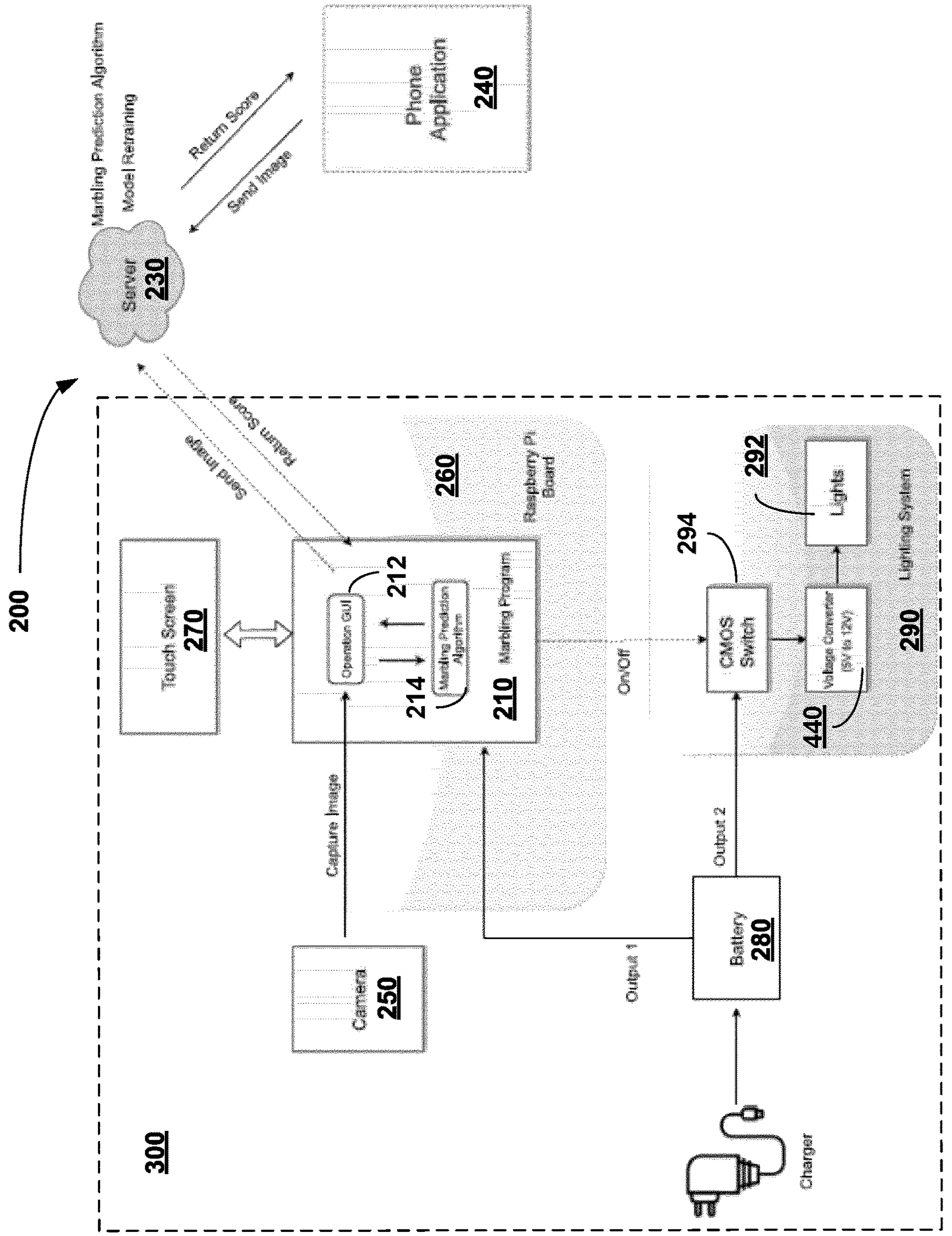
FIG. 2A illustrates, in a block diagram, an example of a system architecture for assessing marbling of meat, in accordance with some embodiments.

FIG. 2A illustrates, in a block diagram, an example of a system architecture for assessing marblings of meat 200, in accordance with some embodiments. The system architecture 200 can operate in three modes, i.e., the standalone mode, the server (e.g., cloud or local/in-house) mode, and the mobile application mode. In the standalone mode, a marbling score calculation program 210 can independently run on a processing device 260 (such as a Raspberry PI™) after a meat image is captured, which can be very useful for the end user in the plant where the internet connection might be poor. The collected images, data and results can be transferred to a local computer, or uploaded to the server, after the operation.

When the internet is available and stable, the system 300 can work in the server (cloud or in house) mode by sending the captured meat image to remote server 230 for marbling detection and calculation, saving the images, data and results on the server, returning the predicted marbling score to the system 300 for display. Due to the more powerful computing capacity, the server mode can run much faster than the standalone mode (1s vs. 10s). In addition, a smart phone application (app) 240 may also be developed to support the system 300 to operate in the mobile application mode. In this case, the meat image will be captured by the camera of a smart phone and sent to the server 230 for marbling detection and calculation. The predicted marbling score will be returned to the smart phone and displayed in the app 240. The marbling predictive models may be retrained in the server based on newly collected data and the updated models will be used for further marbling assessment.

In some embodiments, the hardware system 300 comprises a digital camera 250, a processor board 260, a touch screen 270, a power supply system 280, a lighting system 290, and a shell case 102. A high-definition camera 250 is mounted on top of the shell case 102 and connected to the processor board 260 that is used to provide the calculation power for the marbling detection algorithm. The lighting system based on LED lights 292 is located within the shell case 102 to provide uniformed illumination.

In some embodiments, core hardware units include the processor board 260, display screen 270, camera 250 and components for the lighting system 290. The processor board 260 includes at least one processor. The camera may be used to take high-definition video an swell as still photos.

Figure 2B:
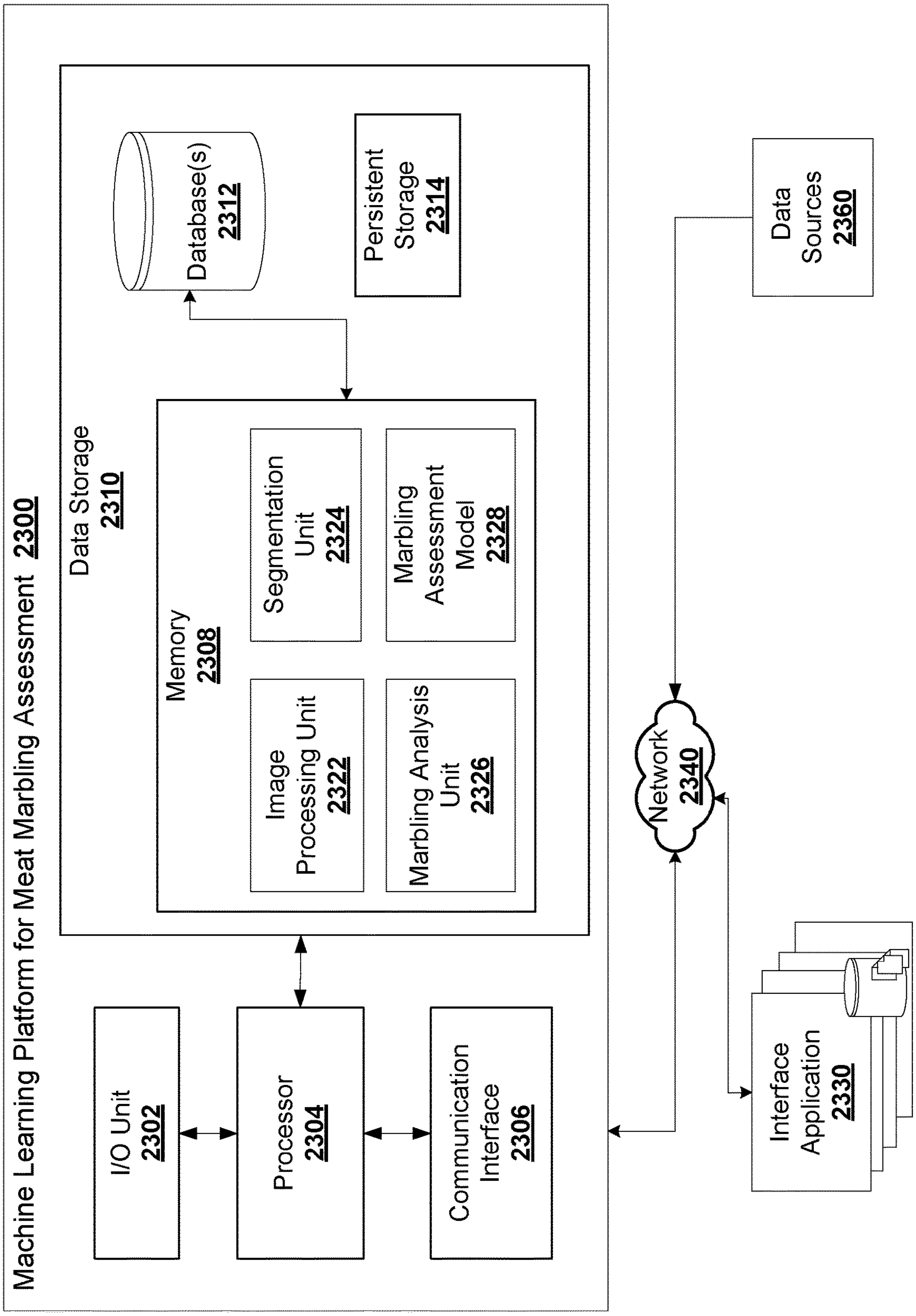
FIG. 2B illustrates, in a schematic diagram, an example of a machine learning platform for meat marbling assessment, in accordance with some embodiments.

FIG. 2B illustrates, in a schematic diagram, an example of a machine learning platform for meat marbling assessment 2300, in accordance with some embodiments. The platform 2300 may be an electronic device connected to interface application 2330 (such as a marbling assessment interface application on a personal computer, a marbling assessment device 300 interface, or a mobile device application) and data sources 2360 (such as meat marbling standards data) via network 2340. The platform 2300 can implement aspects of the processes described herein.

The platform 2300 may include a processor 2304 and a memory 2308 storing machine executable instructions to configure the processor 2304 to receive a voice and/or text files (e.g., from I/O unit 2302 or from data sources 2360). The platform 2300 can include an I/O Unit 2302, communication interface 2306, and data storage 2310. The processor 2304 can execute instructions in memory 2308 to implement aspects of processes described herein.

The platform 2300 may be implemented on an electronic device and can include an I/O unit 2302, a processor 2304, a communication interface 2306, and a data storage 2310. The platform 2300 can connect with one or more interface applications 2330 or data sources 2360. This connection may be over a network 2340 (or multiple networks). The platform 2300 may receive and transmit data from one or more of these via I/O unit 2302. When data is received, I/O unit 202 transmits the data to processor 2304.

The I/O unit 2302 can enable the platform 2300 to interconnect with one or more input devices, such as a keyboard, mouse, camera, touch screen and a microphone, and/or with one or more output devices such as a display screen and a speaker.

The processor 2304 can be, for example, any type of general-purpose microprocessor or microcontroller, a digital signal processing (DSP) processor, an integrated circuit, a field programmable gate array (FPGA), a reconfigurable processor, or any combination thereof.

The data storage 2310 can include memory 2308, database(s) 2312 and persistent storage 2314. Memory 2308 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 2310 can include memory 2308, databases 2312 (e.g., graph database), and persistent storage 2314.

The communication interface 2306 can enable the platform 2300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

The platform 2300 can be operable to register and authenticate users (using a login, unique identifier, and password for example) prior to providing access to applications, a local network, network resources, other networks and network security devices. The platform 2300 can connect to different machines or entities.

The data storage 2310 may be configured to store information associated with or created by the platform 2300. Storage 2310 and/or persistent storage 2314 may be provided using various types of storage technologies, such as solid state drives, hard disk drives, flash memory, and may be stored in various formats, such as relational databases, non-relational databases, flat files, spreadsheets, extended markup files, etc.

The memory 2308 may include an image processing unit 2322 for obtaining and preprocessing images of meat samples, a segmentation unit 2324 for determining regions of interests as described herein, a marbling analysis unit 2326 for determining a marbling score as described herein, and a marbling assessment model 2328 as described herein.

Figure 3:
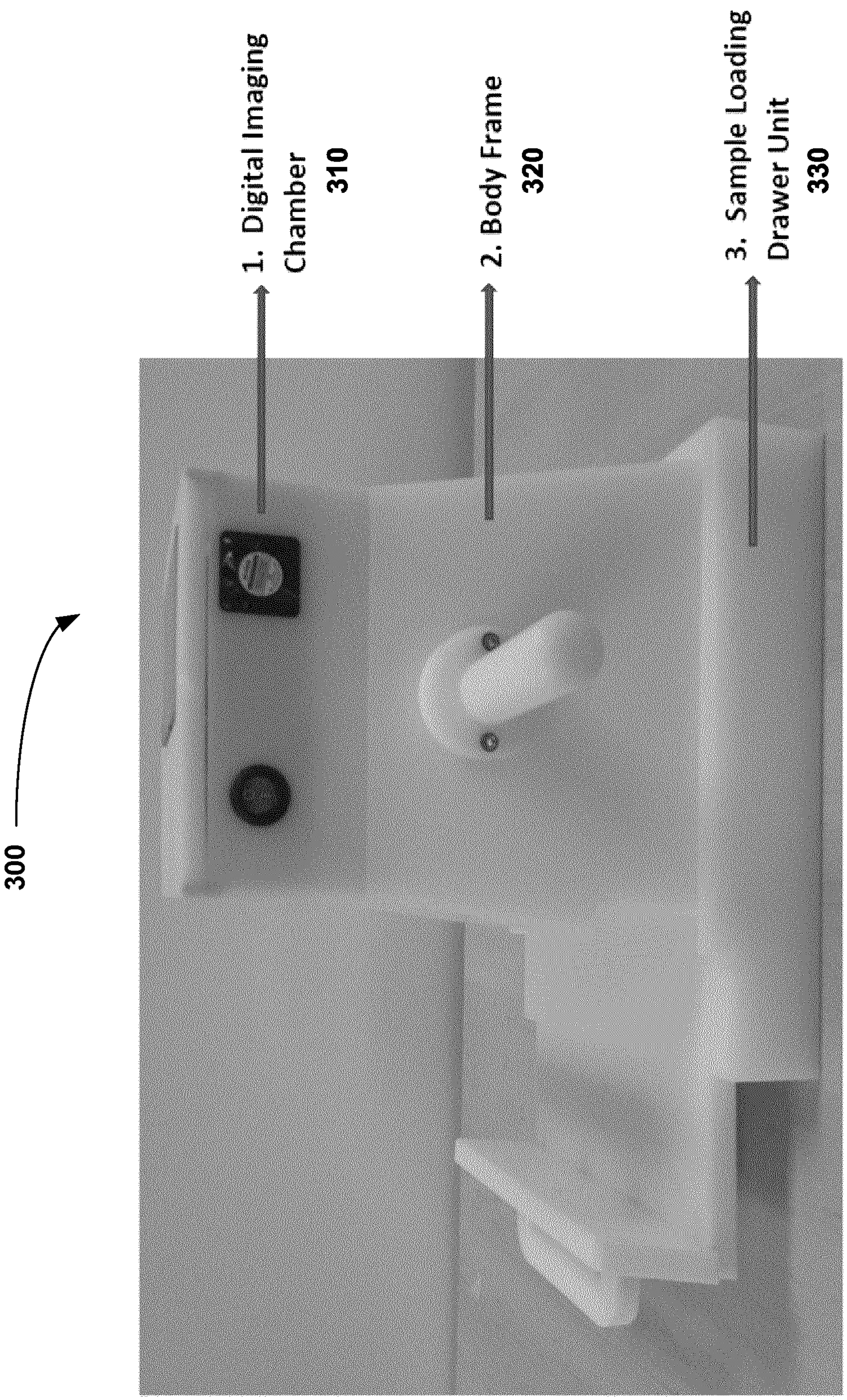
FIG. 3 illustrates, an example of hardware system components, in accordance with some embodiments.

FIG. 3 illustrates, in a photograph, an example of the hardware system components 300, in accordance with some embodiments. The device 300 may comprise a framework assembly including a three-layered Digital Imaging Chamber 310 that encloses all the electronic components and lights, a Body Frame 320 that provides an enclosed environment, and a Sample Loading Drawer Unit 330 where the meat sample is placed.

Figure 4:
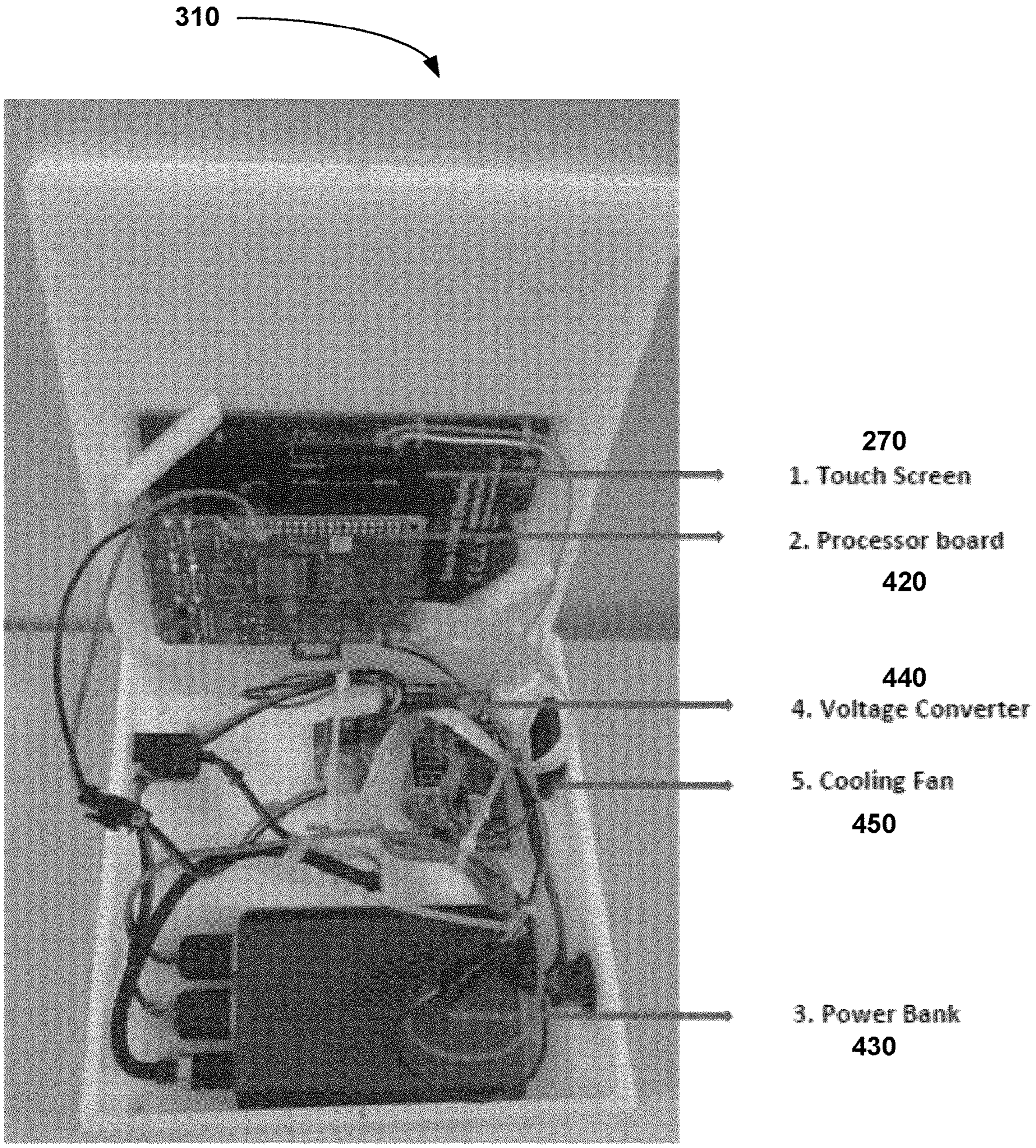
FIG. 4 illustrates examples of internal components to the digital imaging chamber, in accordance with some embodiments.

FIG. 4 illustrates internal components to the digital imaging chamber 310, in accordance with some embodiments. In some embodiments, all hardware—including the electronic components—may be integrated in the Digital Imaging Chamber 310 which in some embodiments is a three-layer cabinet. The top layer (as shown in FIG. 4) includes a display (e.g., a five inch touch screen) 270 (e.g., a Longruner 800×480 TFT LCD Display for Raspberry Pi) used to display the captured image and marbling score, and a processor board 420 (e.g., a Raspberry Pi 3 Model B+, 1.4 GHz 64-bit quad-core processor, and 1 GB LPDDR2 SDRAM) used to acquire and process the image data.

The components on the top side of the middle layer (as shown in FIG. 4) include a power bank 430 (e.g., a Charmast portable, 10400 mAh) used to supply current to the whole Digital Imaging Chamber 310, a voltage converter 440 to increase the power from 5 V to 12 V for the power supply to the LED lights 292, and a cooling fan 450 mounted on the wall to reduce the heat produced by the processor.

Figure 5:
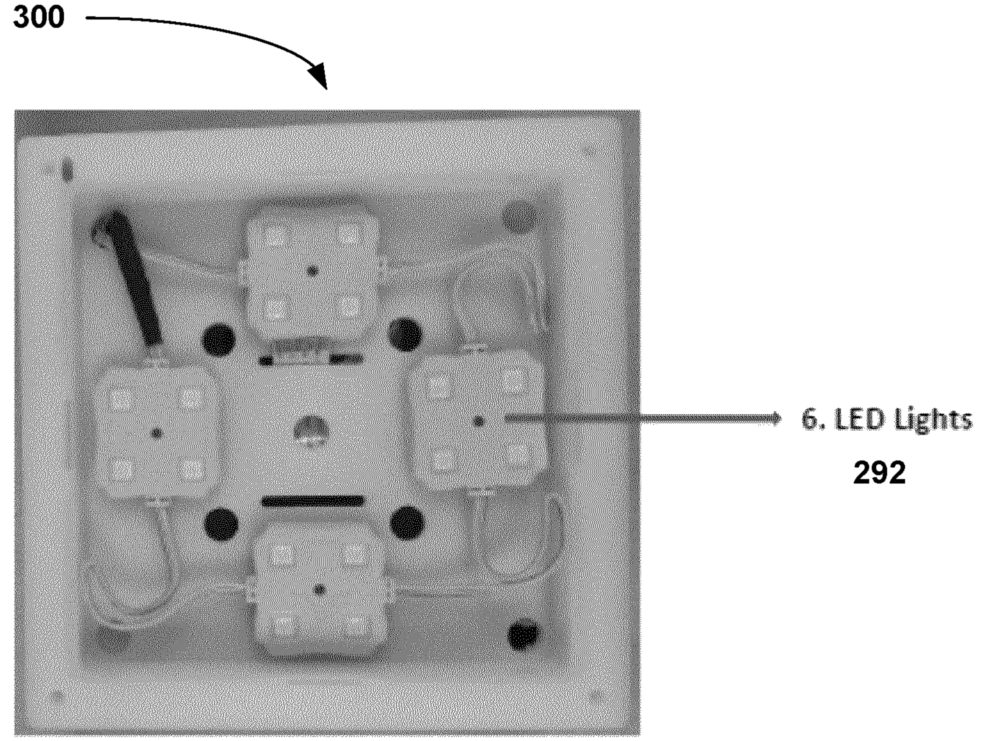
FIG. 5 illustrates an example of a middle layer of the digital imaging chamber, in accordance with some embodiments.

FIG. 5 illustrates a middle layer of the digital imaging chamber 310, in accordance with some embodiments. At the bottom side of the middle layer are four pieces of 4-dots strip LED lights 292 with, in some embodiments, 5000 K colour temperature to provide natural daylight illumination for imaging meat samples, as shown in FIG. 5. In some embodiments, the lighting system 290 comprises at least one LED light 292, a diffusion sheet 620 and an electronic control device 294.

Figure 6A:
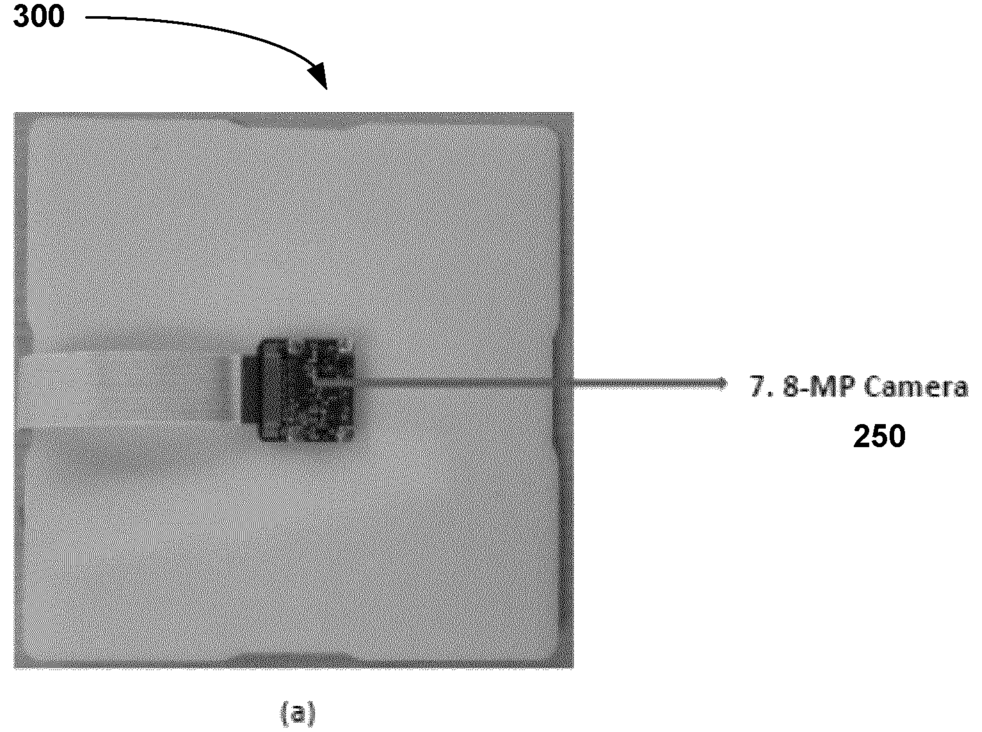
FIGS. 6A and 6B illustrate an example of a bottom layer of the digital imaging chamber, in accordance with some embodiments.
Figure 6B:
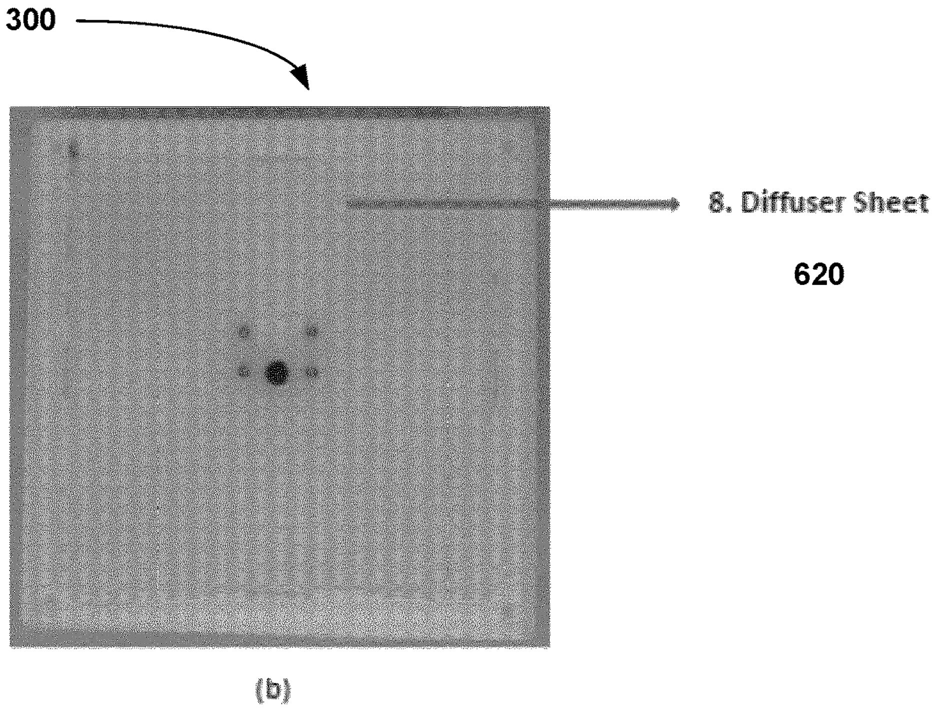

FIGS. 6A and 6B illustrate a bottom layer of the digital imaging chamber 310, in accordance with some embodiments. The bottom layer as shown in FIGS. 6A and 6B includes a camera 250 such as an 8MP camera (e.g., Raspberry Pi Camera Module v2) mounted on the top side of the bottom layer with the lens on the bottom side to acquire the images, and an acrylic light diffuser sheet 620 adhered to the bottom side to provide uniform illumination for imaging. The diffusion sheet (or diffuser sheet) 620 may comprise a lightweight plastic panel which diffuses light when lights transmit through the sheet. The diffuser sheet 620 may ensure that the light on the surface of the meat sample is uniform. In some embodiments, the material of the diffusion sheet 620 is acrylic.

Figure 7A:
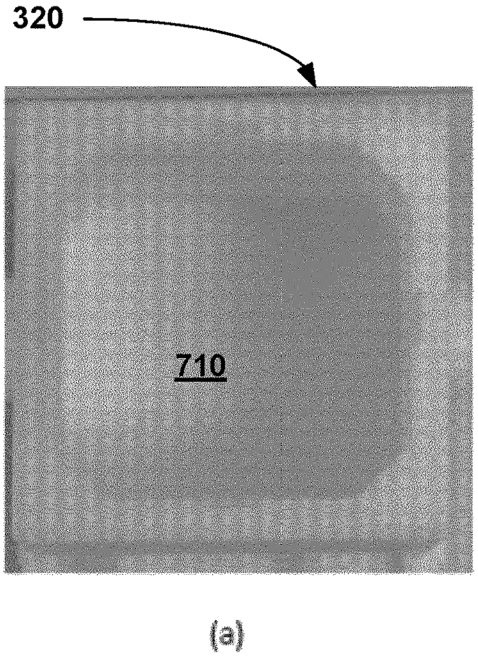
FIGS. 7A and 7B illustrate an example of a body frame of the device, in accordance with some embodiments.
Figure 7B:
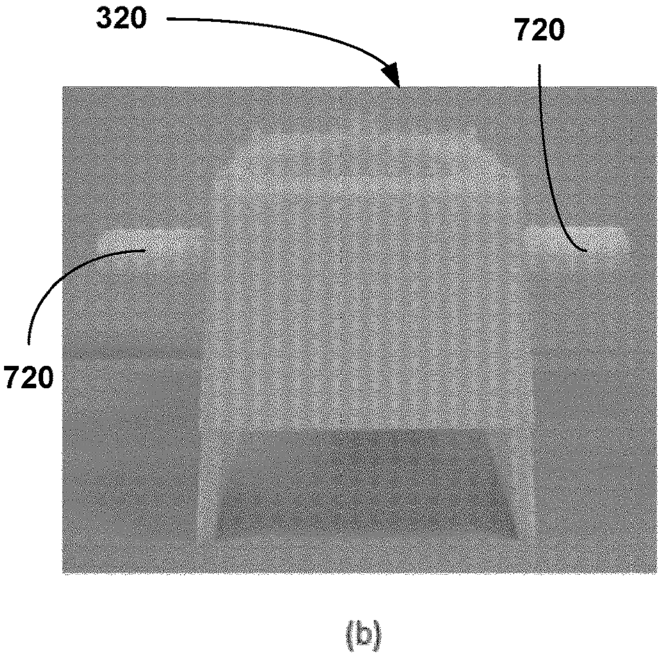

FIGS. 7A and 7B illustrate an example of a body frame 320 of the device 300, in accordance with some embodiments. In some embodiments, the body frame 320 is designed as a hollow trunk 710 to provide an enclosing environment for the uniform illumination. The convex isosceles trapezoid design with an octagon-shaped opening allows the camera 250 to have the maximum field of view as shown in FIG. 7A. The two side handles 720 of the body frame 320 (as shown in FIG. 7B) may be used to carry the marbling meter.

Figure 8B:
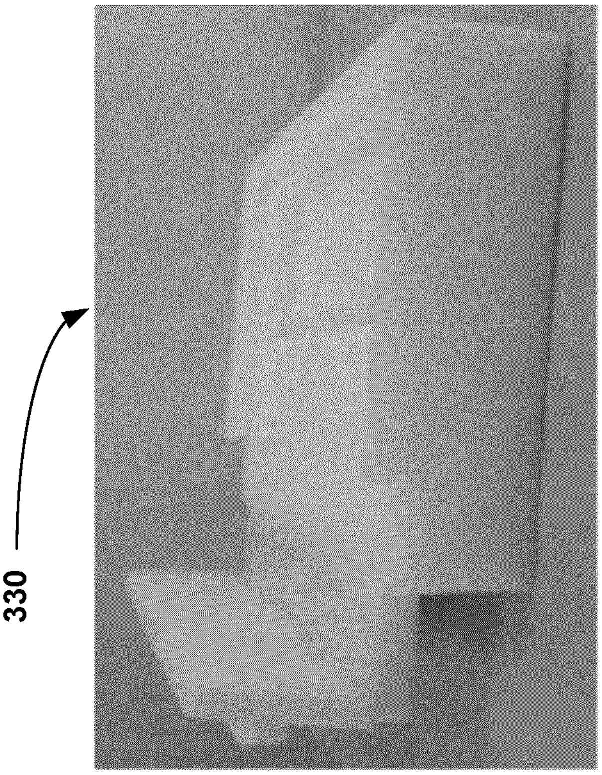
FIGS. 8A and 8B illustrate an example of a loading drawing unit of the device, in accordance with some embodiments.
Figure 8A:
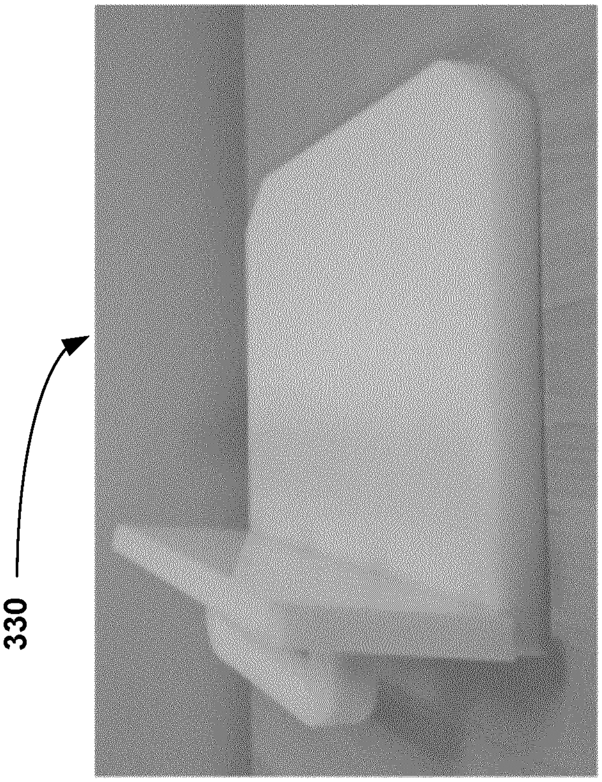

FIGS. 8A and 8B illustrate an example of a loading drawing unit 330 of the device 300, in accordance with some embodiments. The sample loading drawer unit 330 comprises a tray with a door and a solid bottom with a groove as shown in FIGS. 8A and 8B. This design allows for placement of meat samples and provides uniform or near-uniform illumination.

The Digital Imaging Chamber 310, the Body Frame 320, and the solid bottom of the drawer unit 330 may be attached to each other into one piece with screws, as shown in FIG. 3. A removable part of the Marbling Meter device 300 is the sample loading drawer 330 (i.e., the tray with a door) for the meat sample placement.

Two issues regarding lighting were addressed during the device 300 design. One issue pertains to uneven lighting condition that may cause different image contrast which can influence the ROI segmentation results. To provide uniformed illumination, four LED lights 292 may be arranged in a squared shape to spread out the light as shown in FIG. 5. The other issue regarding lighting is strong reflection that is caused by the water residue on the surface of the meat sample, which may mislead the marbling detection algorithm and extract fake marblings (i.e., false positive marbling). To solve this problem, all LED lights 292 may be placed on top of the bottom layer of the Digital Imaging Chamber 310 to diffuse the dot light when it transmits through the plastic. In addition, a diffusion sheet 620 is attached to the bottom of the bottom layer to further diffuse the light.

In some embodiments, a power bank is used to provide the power to the processor board 260 and the LED lights 292 which have different work powers. In some embodiments, the work power of the processor board is 5V which is same as the output voltage of the power bank, while the work power of the LED lights 292 is 12V which is much higher than the output voltage of the power bank. Considering the limited space of the Digital Imaging Chamber 310 which is difficult to hold another power bank with 12V output voltage, a voltage converter 440 may be used to step up the power from 5V to 12V to supply the power to the LED lights 292. Two independent ports of the power bank may be used to supply power to the processor board 260 and the LED lights 292 separately in order to prevent the disturbance between different voltages.

Four LED lights 292 can generate a lot of heat for a long term operation as well as the other electronic components. Overheated environment will cause off-performance of the Marbling Meter device 300. In order to reduce the heat accumulated during operation, three treatments may be added in the design as follows:

(1) A cooling fan 450 may be used to dissipate the heat as shown in FIG. 4.

(2) A heat sink may be attached to each board chip's surface to transfer the heat generated by the electronic to air.

(3) Small round openings may be made in the device 300 to exchange the heat from inside to outside of the device 300, which includes nine openings on the middle layer of the Digital Imaging Chamber 310 (as shown in FIG. 5) where the LED lights 292 and most electronic components are attached and four openings at the front side of the Digital Imaging Chamber 310.

Figure 9A:
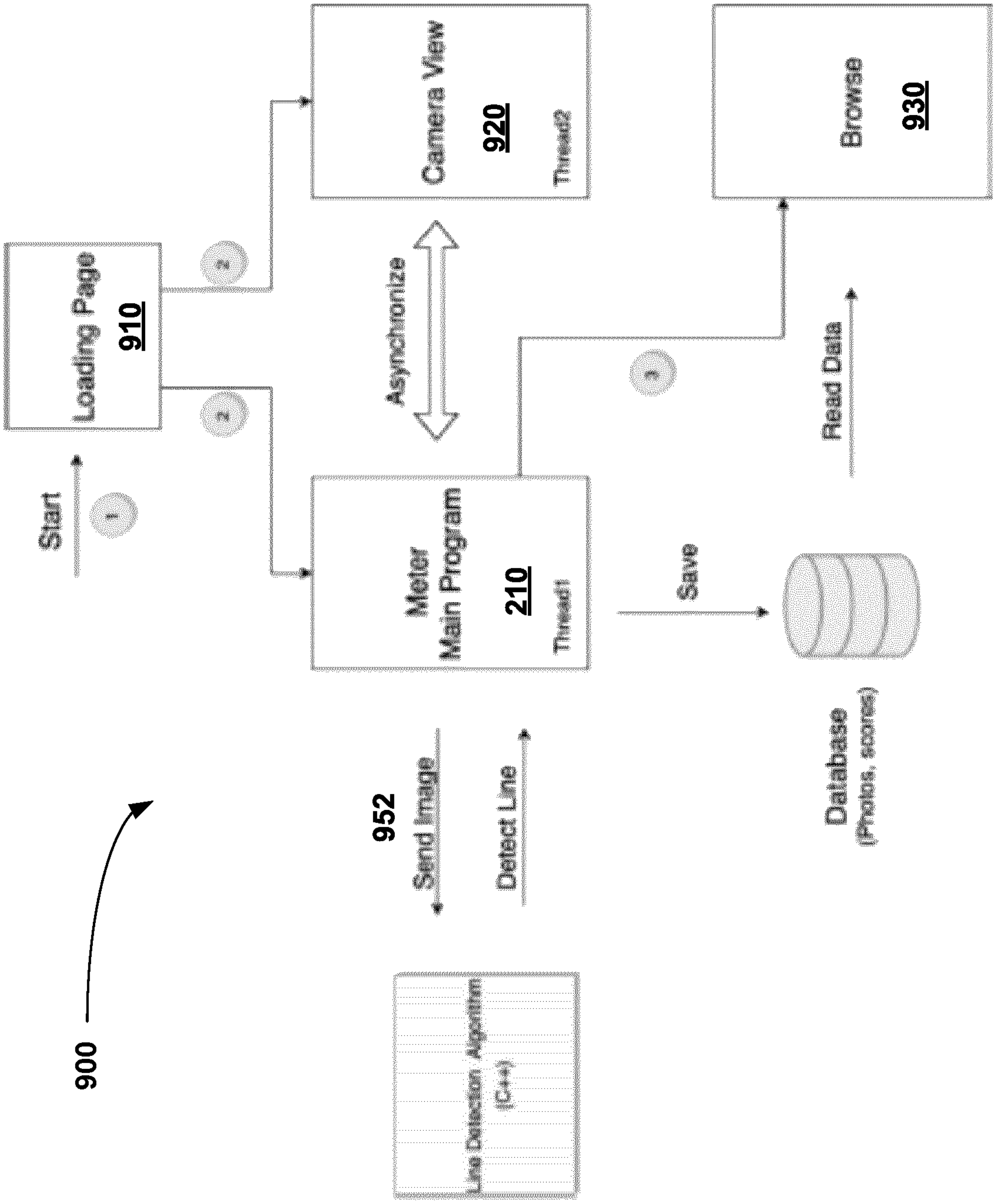
FIG. 9A illustrates an example of a software architecture of a meat marbling assessment system, in accordance with some embodiments.
Figure 9B:
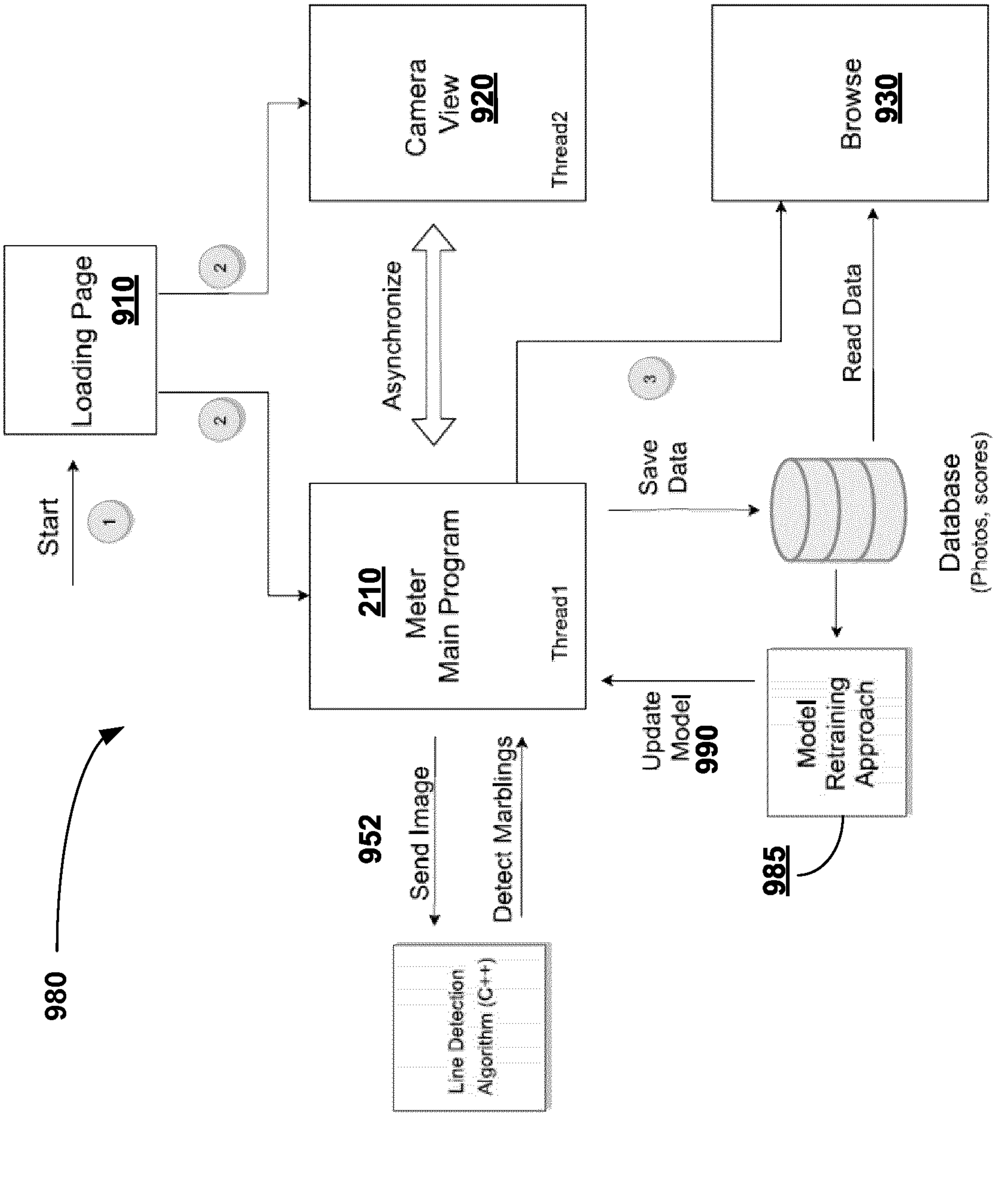
FIG. 9B illustrates another example of a software architecture of a meat marbling assessment system, in accordance with some embodiments.

FIGS. 9A and 9B illustrate examples of a software architecture 900, 980 for meat marbling assessment 300, in accordance with some embodiments. The software system can automatically assess meat marbling scores (such pork marbling scores and marbling scores of other types of meat) based on the selected standard and retrain the marbling predictive models based on new collected data. The meat marbling assessment function of the software system may be embedded in the device (the standalone Marbling Meter or a smart phone app) to automatically analyze the input image and calculate the marbling scores in real-time based on the selected standard. After starting the software, the device 300 will enter the loading page program 910 where the sample information will be recorded. After the loading page 910, two new threads will be started. One is a thread for the Camera View 920 that provides the live video. The other is a thread for the Main Program 210, i.e., the Marbling Program including the Operation GUI 262 and Marbling Prediction Algorithm 264 as shown in FIG. 2. The Main Program 210 also allows the client to browse 930 the captured images and predicted scores at any time. Collected data, including meat images and predicted marbling scores, may be uploaded to a database which is stored in a server. In some embodiment, a model retraining function 985 of the software system 900 may be available on the server. In some embodiments, there are three different model retraining methods 985 that may be used to update and improve the marbling predictive models 990, i.e., online, offline and batch-based. In the online model retraining method, each time a new observation is available, the model may be trained by doing backpropagation with the single observation. In the offline model retraining method, new observations may be collected and added to an already existing data set, and the model may be entirely retrained on the new, bigger data set. In the batch-based model retraining method, once a batch of n new observations are collected, the already existing model may be updated via training on this new batch. The size of the batch n can be automatically and dynamically determined by comparing newly collected data and the existing dataset.

In some embodiments, the marbling assessment system 200 has three different work modes: the server mode, the standalone mode, and the mobile application mode, as shown in FIG. 2. The Marbling Meter 300 may be used in the server mode or the standalone mode. A mobile device application may be used in the mobile application mode.

In the server mode (e.g., cloud server or in-house), the Marbling Meter device 300 may perform as a terminal device. The end user can record the sample information and capture meat images through the Operation GUI 262 in the Marbling Meter device 300. After selecting the marbling standard, the sample information and meat images will be automatically sent 952 to a remote server that can be in-house or in the cloud. The marbling detection and score calculation may be implemented in the remote server using the Marbling Prediction Algorithm 264. The predicted marbling scores may be returned to the Marbling Meter device 300 and displayed on the screen 270. All data including the sample information, images, and results may be saved on the server. In some embodiments, it takes approximately one or two seconds for the marbling score assessment (sending the meat image to the server, calculating the marbling score, and returning the score to the device) when the Marbling Meter device 300 works in the cloud server mode.

In the standalone mode, the Marbling Meter device 300 can work as a standalone device, which can be very useful when the internet connection is not available or very poor. The Marbling Program 210 including Operation GUI 212 and Marbling Prediction Algorithm 214 can independently run on Raspberry PI or another processing board 260. All collected images, data and results will be saved in the device during the operation and can be transferred to a local computer (such as a personal computer) after the operation. In some embodiments of this mode, the marbling score assessment may take approximately ten seconds after the standard is selected.

A smartphone application (app) of the Marbling Meter may assess meat marbling scores in the mobile application mode. Instead of the Marbling Meter device 300, a mobile device (such as a smart phone) where the Marbling Meter App 240 is installed may be used to set up the sample information and capture the meat image through the user interface (UI) of the app 240. Similar to the cloud server mode, the sample information and meat image may be sent to the remote server after the marbling standard is selected in the UI. The Marbling Prediction Algorithm 214 may be implemented in the server 230 and the predicted marbling score may be returned to the smart phone and displayed in the app 240. All data, images and information may be saved in the server. In some embodiments, it takes approximately one or two seconds for the Marbling Meter App 240 to assess marbling scores.

In some embodiments, the Operation GUI 212 allows the end user to record the sample information, capture the meat sample, select the marbling standard for assessment, and display the predicted scores on the screen 270. The Operation GUI 212 also allows the end user to browse 930 the previous captured pork images and the corresponding marbling scores. Detailed description of the GUI can be found below where use case examples of the Marbling Meter Device 300 and Marbling Meter App 291040 are described step by step for the standalone/cloud server mode and the mobile application mode, respectively.

Figure 10:
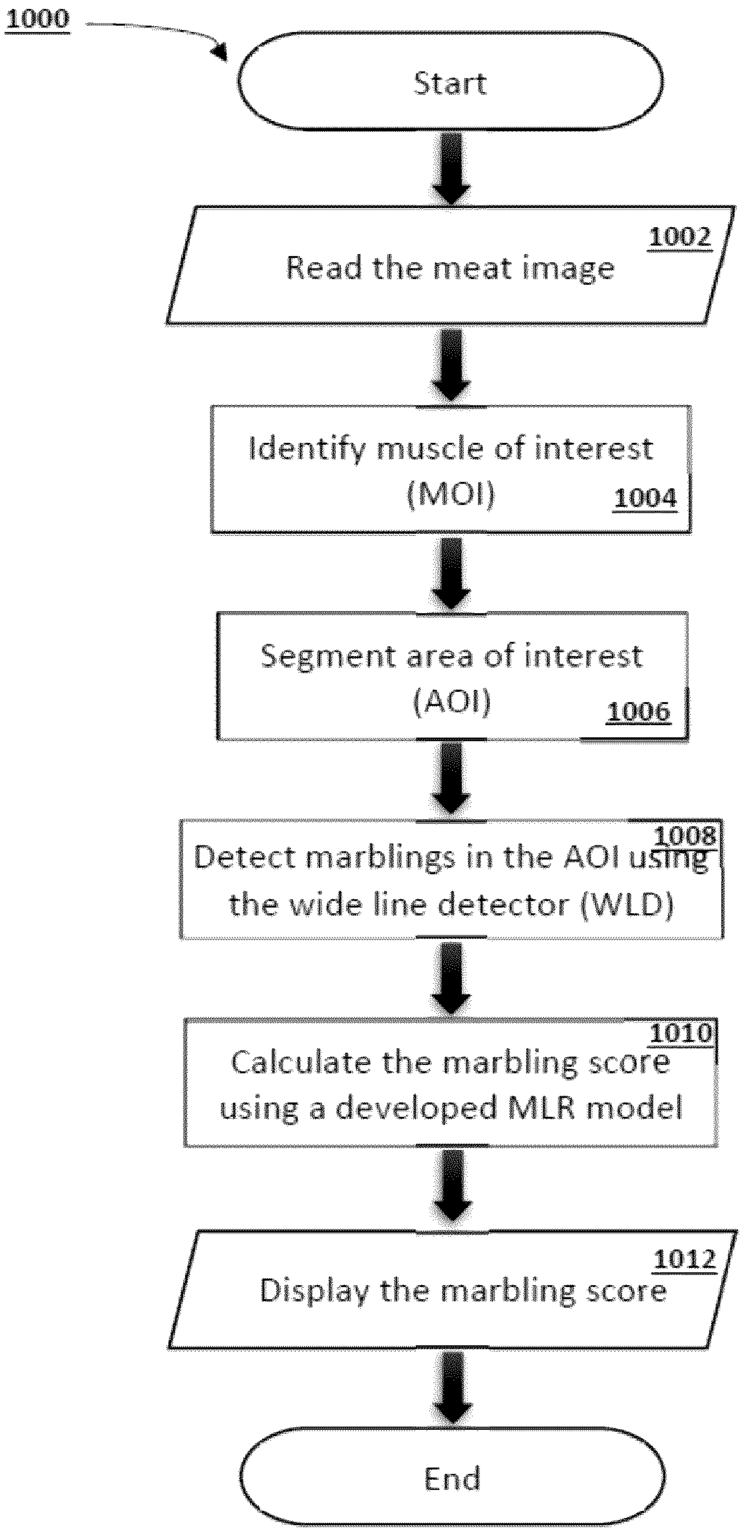
FIG. 10 illustrates, in a block diagram, an example of a method of assessing a meat marbling, in accordance with some embodiments.

FIG. 10 illustrates, in a block diagram, an example of a method of assessing pork marblings 1000, in accordance with some embodiments. The method 1000 comprises reading an image 1002 of a meat sample (i.e., a chop, slice or cut, or a whole loin), identifying the muscle of interest (MOI) 1004 of the meat sample, segmenting the area of interest (AOI) 1006 in the MOI, detecting marblings 1008 in the AOI, calculating the marbling score 1010 and displaying the marbling score 1012 of the meat sample. Other steps may be added to the method 1000. In some embodiments, the transverse section of either the blade end or the sirloin end is imaged in the case of a whole loin. In some embodiments, the MOI is identified 1004 using a dynamic segmentation method that may be developed based on unsupervised machine learning methods. In some embodiments, the marblings in the AOI are detected 1006 using a wide line detector (WLD). In some embodiments, the marling score is determined 1010 using supervised machine learning models such as a multiple linear regression (MLR) model.

Figure 11A:
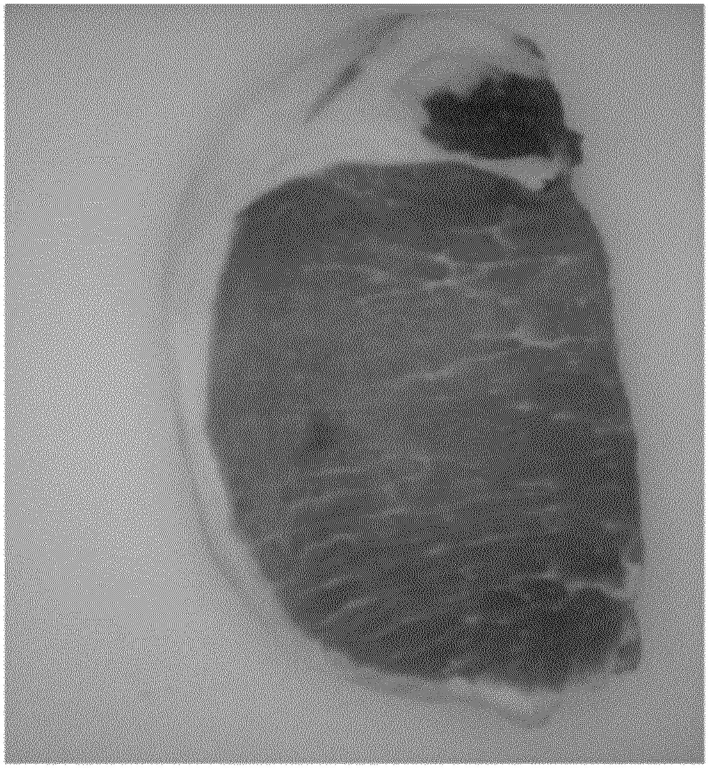
FIGS. 11A to 11D illustrate an example of an application of the method on an example of a pork sample, in accordance with some embodiments.
Figure 11B:
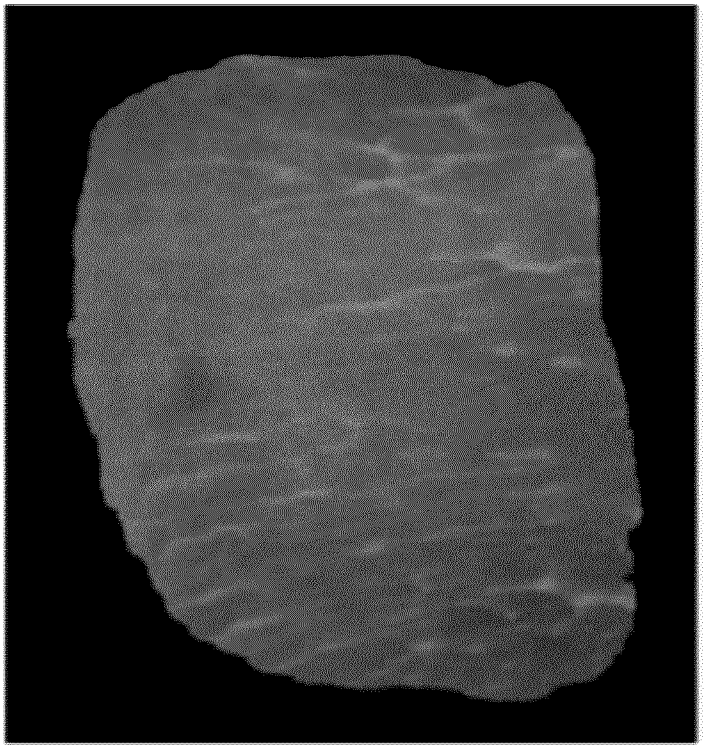
Figure 11C:
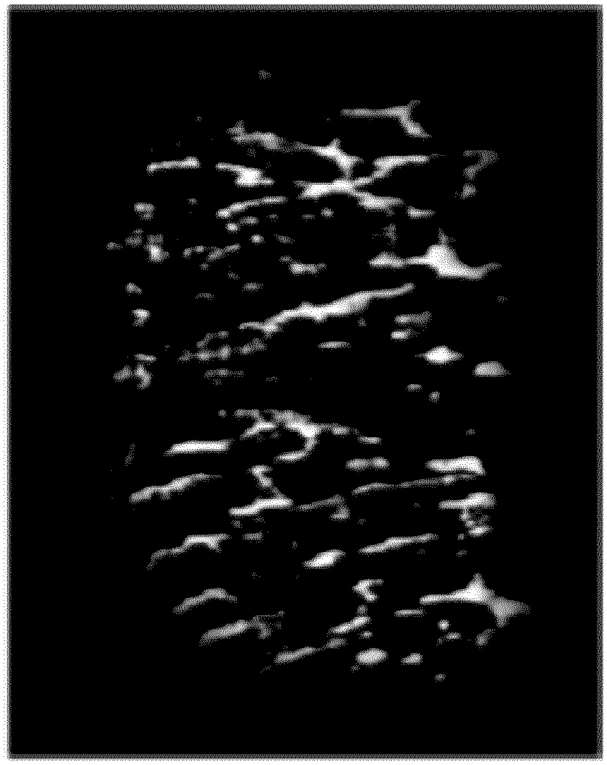
Figure 11D:
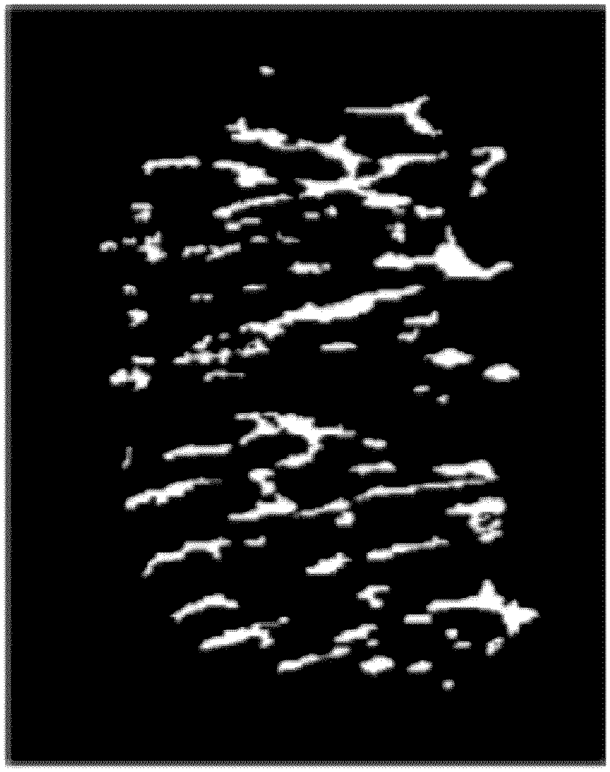

FIGS. 11A to 11D illustrate an example of an application of the method 1000 on an example of a pork sample, in accordance with some embodiments. In the method 1000, a good quality image 1110 (FIG. 11A) is segmented to obtain the region of interest (ROI) 1120 of the meat sample (FIG. 11B) using a new segmentation algorithm. Marblings 1130 within the ROI are then detected as line patterns using the Wide Line Detection (WLD) technique, as shown in FIG. 11C. The proportion of marblings (PM) is calculated based on the binarized marblings 1140 (FIG. 11D) for the assessment of marbling scores.

In order to calculate a marbling score for pork chops, they should be segmented accurately. Inaccurate segmentation will lead to wrong calculation of marbling scores. The segmentation of pork chop from an RGB image includes challenges involved such as different size and shapes, variable pixel intensity of chops, inconsistent lighting, occlusion of dark muscle and normal muscle, presence of fat and inter muscular fat in various portions of the pork sample, etc.

The objectives of the pork segmentation is to identify the muscle of interest (MOI) if multiple muscles present in the pork image and segment the area of interest in the MOI where the marblings will be detected and marbling scores calculated. The pork ROI segmentation involves removing the peripheral and inter-muscular fat from the pork sample, identifying the muscle of interest (MOI), and segmenting the area of interest in the MOI by removing the connective tissue and surrounding muscles from the MOI. Inaccurate segmentation will lead to wrong calculation of marbling scores. Although different image segmentation methods such as thresholding, active contour, graph cut, auto cluster and region-based segmentation have been developed and widely used, the segmentation of a pork image is still challenging not only due to variable pixel intensity and lighting conditions, but also due to different colour tones within a muscle, presence of multiple muscles, and strong reflection caused by the water residue on the surface of the pork chop.

To address these challenges, a dynamic segmentation method was developed. This method automatically selects a segmentation method such as thresholding, clustering-based segmentation, regression model and morphological operations based on the appearance of the pork image. Otsu's thresholding is a global thresholding technique and works well when the pork sample is simple, e.g., one main muscle with peripheral fat, while K-means clustering is a colour-based segmentation technique that works well when the pork sample has more than one main muscles and different colour tones. The dynamic segmentation method can automatically identify the appearance of a pork sample and accordingly select the proper segmentation technique for the input pork image.

It should be understood that the examples of segmentation described herein with respect to pork may also apply to other types of meat.

Figure 12:
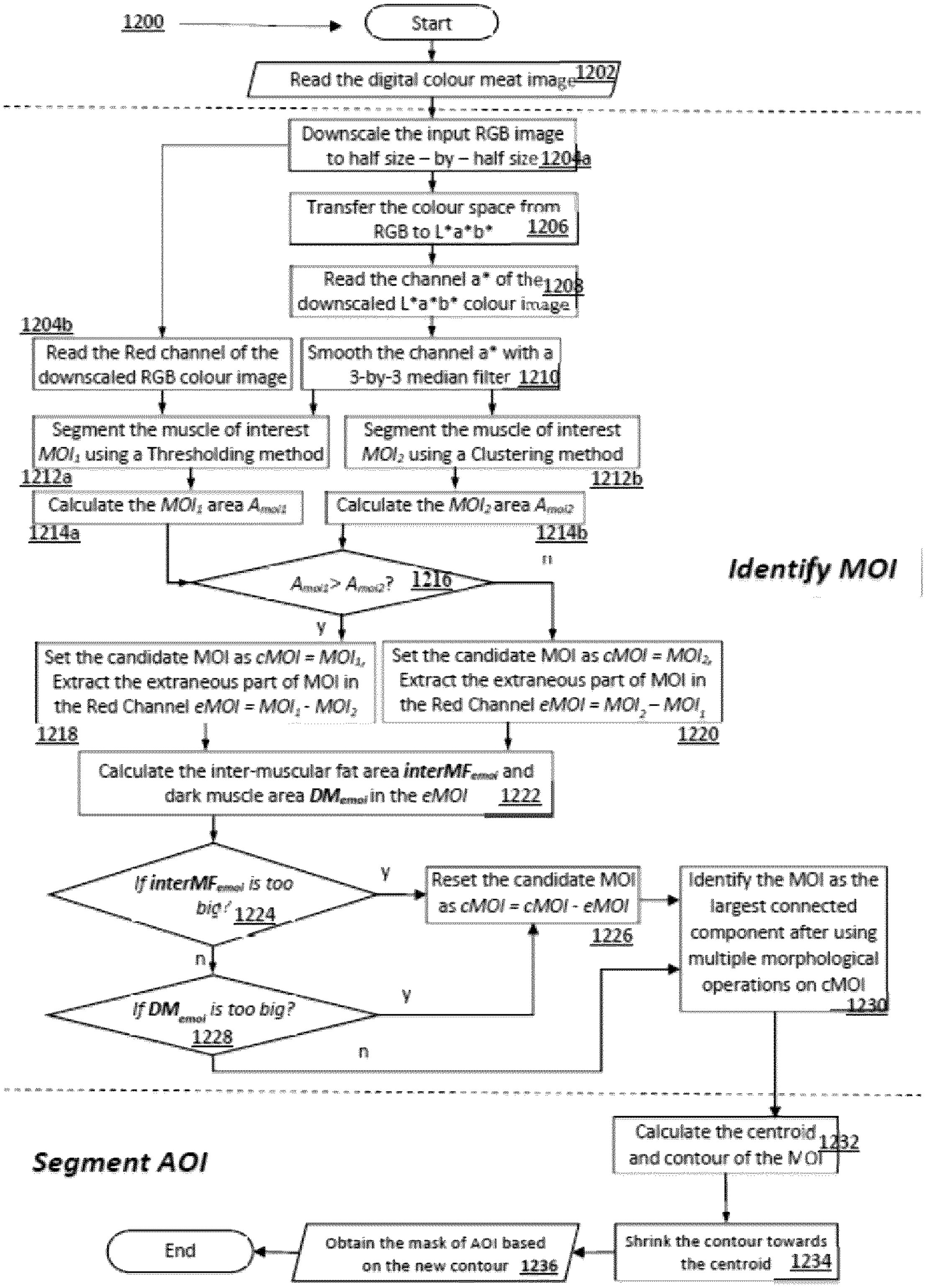
FIG. 12 illustrates, in a flowchart, an example of an overall method of segmentation, in accordance with some embodiments.

FIG. 12 illustrates, in a flowchart, an example of an overall method of ROI segmentation 1200 including identification of muscle of interest (MOI) and segmentation of area of interest (AOI), in accordance with some embodiments. The method 1200 comprises reading (e.g., obtaining) an input digital colour image 1202. The input image is downscaled to its half 1204*a*. The downscaled image's colour space is transferred from RGB to L*a*b* 1206. The channel a* of the downscaled L*a*b* colour image 1208 is read. The a* channel is smoothed 1210 with a 3-by-3 median filter. A two-layer thresholding method is applied on the smoothed channel a* 1210 and the red channel of the downscaled RGB colour image 1204*b* to obtain the muscle of interest $MOI_1$ 1212*a*, while a multi-level clustering method is also applied on the smoothed channel a* 1210 to obtain the muscle of interest $MOI_2$ 1212*b*. The area of the $MOI_1$, i.e., $A_{moi1}$ 1214*a*, is calculated, as well as the area of $MOI_2$, i.e., $A_{moi2}$ 1214*b*. If $A_{moi1}>A_{moi2}$ 1216, then the candidate MOI, i.e., cMOI, is $MOI_1$ and the extraneous part of MOI (eMOI) is extracted as $eMOI=MOI_1-MOI_2$ in the red channel 1218. Otherwise, the candidate MOI (cMOI) is $MOI_2$ and the extraneous part of the MOI is extracted as $eMOI=MOI_2-MOI_1$ in the red channel 1220. The inter-muscular fat area ($interMF_{emoi}$) and the dark muscle area ($DM_{emoi}$) in the eMOI 1222 are calculated. If $interMF_{emoi}$ is greater than a certain empirical threshold 1224, the candidate MOI is reset as cMOI=cMOI−eMOI 1226. Otherwise, if $DM_{emoi}$ is greater than a certain empirical threshold 1228, the candidate MOI is also reset as cMOI=cMOI−eMOI 1226. The MOI is identified 1230 as the largest connected component after applying multiple morphological operations on the candidate MOI (cMOI), i.e., opening and closing with a disk sized structuring element having radius 5. The centroid and contour of the MOI is calculated 1232. The contour is shrunk 1234 by moving every contour pixel towards the centroid. Finally, the mask of AOI 1236 is obtained based on the new contour. Other steps may be added to the method 1200.

Figure 13A:
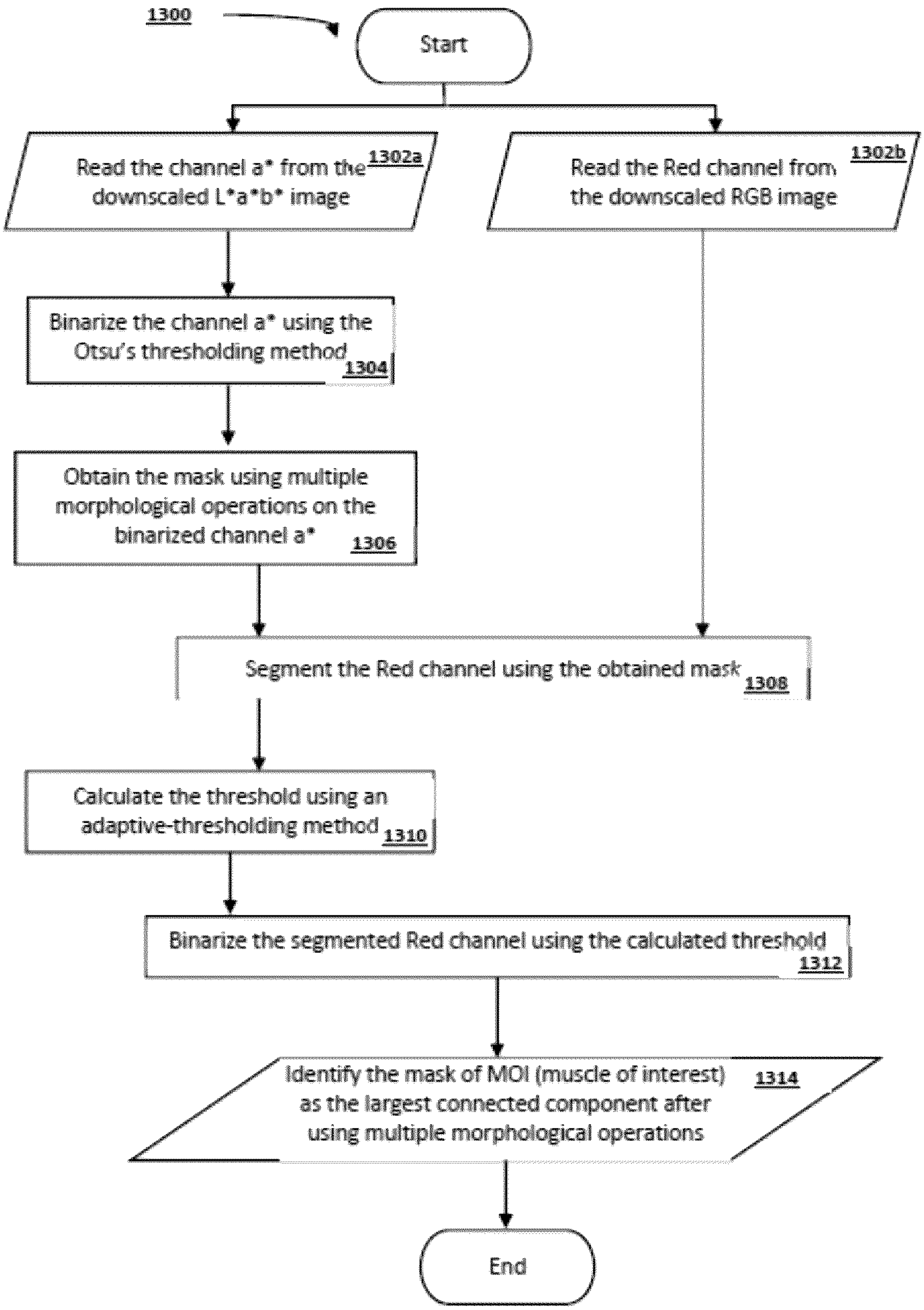
FIGS. 13A and 13B illustrate, in flowcharts, examples of methods of a thresholding method based segmentation and a clustering method based segmentation, respectively, in accordance with some embodiments.
Figure 13B:
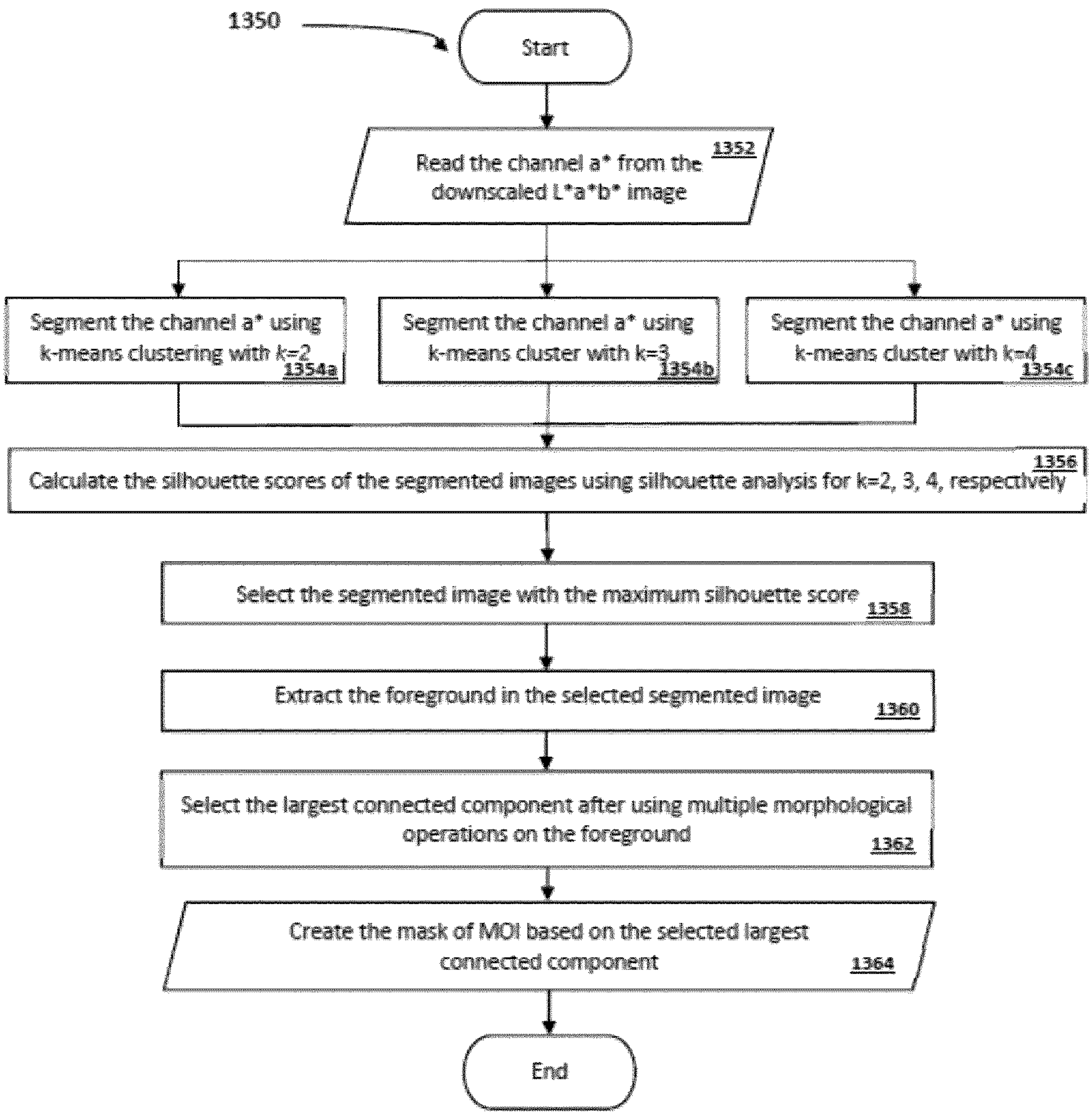

FIGS. 13A and 13B illustrate, in flowcharts, examples of methods of thresholding-based segmentation 1300 and clustering-based segmentation 1350, respectively, in accordance with some embodiments. In some embodiments, a two-layer thresholding method that is based on Otsu thresholding and adaptive thresholding is used in method 1300, and multi-level Kmeans clustering is used in method 1350. It is understood that other thresholding and/or clustering methods may be used.

The method 1300 comprises obtaining (e.g., reading) the channel a* from the downscaled L*a*b* image 1302*a* and obtaining (e.g., reading) the red channel from the downscaled RGB image 1302*b*. The channel a* is binarized 1304 (e.g., using Otsu's thresholding). A mask is obtained 1306 using multiple morphological operations such as opening and closing with disk sized structuring element followed by an operation of filling holes. The red channel is segmented 1308 using the obtained mask. A new threshold is calculated 1310 in an adaptive way based on the statistics (including mean and standard deviation, and other statistics) of the segmented red channel image. The segmented red channel is binarized 1312 using the calculated threshold. The mask of MOI is identified 1314 as the largest connected component after applying multiple morphological operations such as opening and closing operations followed by filling holes. Other steps may be added to the method 1300.

The method 1350 comprises reading the channel a* from the downscaled L*a*b* image 1352. Then the channel a* image is segmented using k-means clustering with different numbers of clusters such as k=2 1354*a*, *k*=3 1354*b*, and k=4 1354*c*, respectively. The silhouette scores of the segmented images are calculated using silhouette analysis for k=2, 3, and 4, respectively 1356. The segmented image having highest silhouette score is selected 1358. The foreground is extracted from the selected segmented image 1360. The largest connected component is selected 1362 after applying multiple morphological operations such as opening, closing, hole-filling, dilation, erosion on the foreground. Finally, the mask of MOI is created 1364 based on the selected largest connected component. Other steps may be added to the method 1350.

Figure 14:
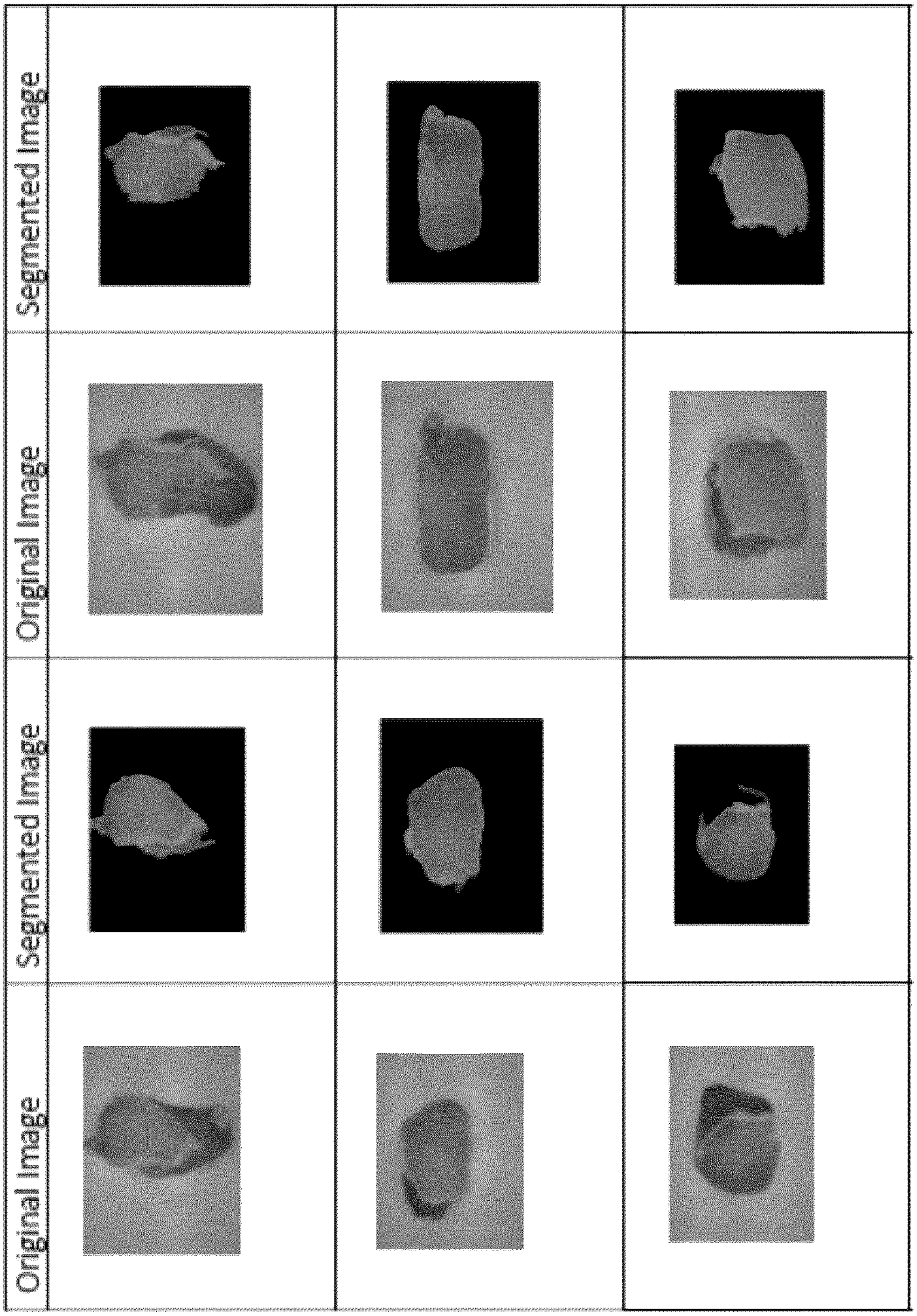
FIG. 14 illustrates examples of ROI segmentation (including MOI identification and AOI segmentation) results using the dynamic segmentation method, in accordance with some embodiments.

FIG. 14 illustrates examples of ROI segmentation results 1400 using the dynamic segmentation method 1200, in accordance with some embodiments.

Different linear regression models may be established based on the NPPC and CPI standards. The marbling score of a pork sample may be assessed based on the linear regression model corresponding to the selected standard. The prediction results may be displayed on the touch screen 270 of the Marbling Meter device 300. Experiments based on 74 pork samples have shown the Marbling Meter device 300 can accurately predict marbling scores with a deviation between −0.5 and +0.5 comparing to the ground truth.

The Marbling Meter device 300 can automatically, objectively and accurately assess pork marbling scores in real time. This device 300 will not only save the industry time for quality assessment of pork chops, but also bring economic benefits considering the objectivity of quality assessment and product differentiation.

Figure 15:
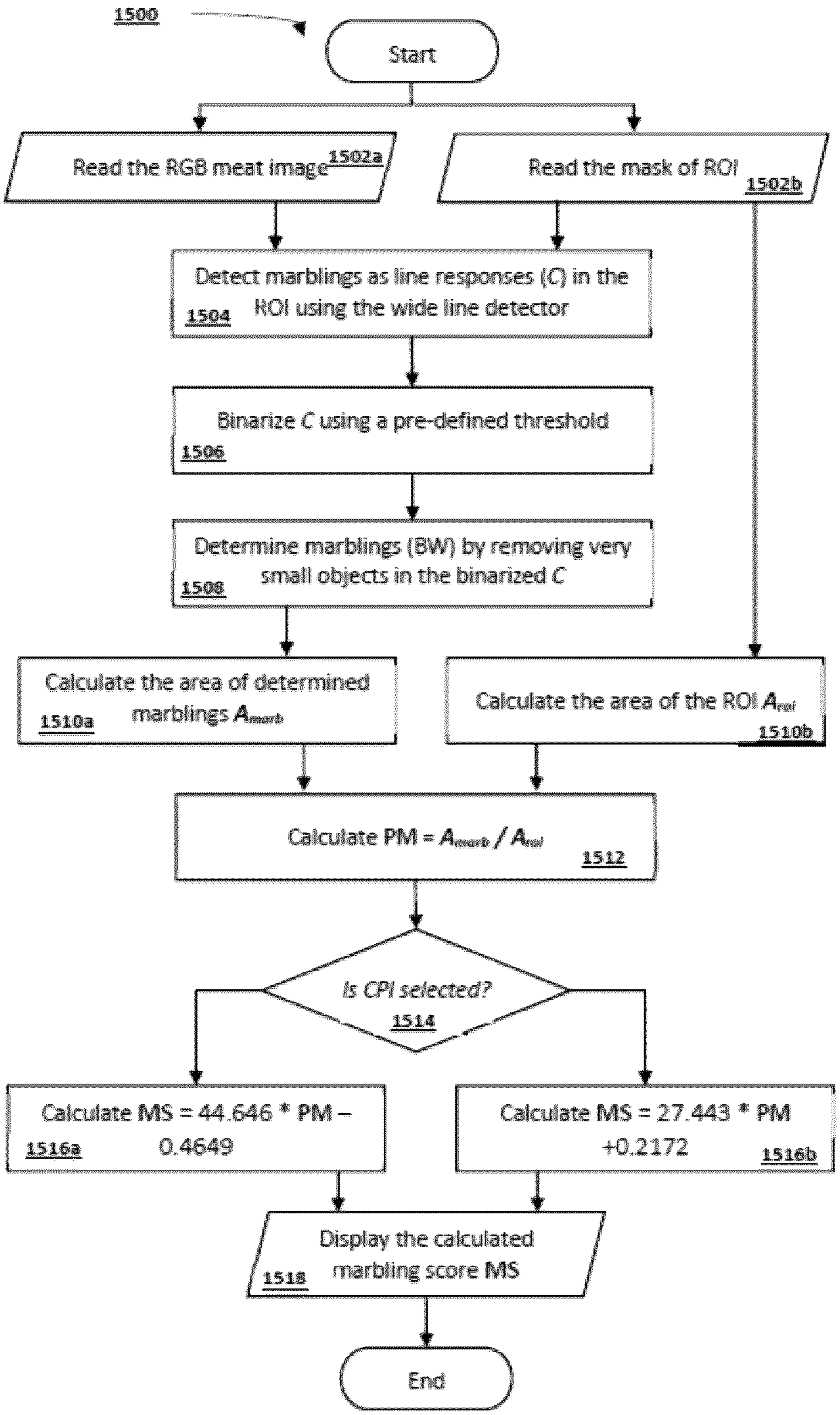
FIG. 15 illustrates, in flowchart, an example of a method of determining a marbling score, in accordance with some embodiments.

FIG. 15 illustrates, in flowchart, an example of a method of determining a marbling score 1500, in accordance with some embodiments. To calculate the marbling score, the ROI segmented (color) pork chop image may be input to a marbling score method. As the marbles look like lines within a chop, an empirical threshold value may be used to capture the line response. Unnecessary objects present in the line response image may then be removed. The line response image is a binary image. In the process of calculating the marbling score, the area of marblings is divided with the area of the ROI of the pork image. The result is stored in a variable called PM. In one embodiment, seven images with their PMs and labels both for CPI and NPPC standards were used as training samples.

The method 1500 comprises obtaining (e.g., reading) the input digital colour image 1502*a* and obtaining (e.g., reading) the mask of ROI. Marblings in the ROI is detected 1504 as line responses (C) using the wide line detector. The detected marblings (C) is binarized 1506 using a pre-defined threshold. Marblings (WB) is determined 1508 by removing very small objects in the binarized marbling (C) image. The area of the determined marblings $A_{marb}$ 1510*a* and the area of the ROI $A_{roi}$ 1510*b* are calculated, and based on them, the variable PM is calculated 1512 as the ratio of $A_{marb}$ and $A_{roi}$. If the CPI standard is selected 1514, the LR model for CPI standard is used to calculate the marbling score 1516*a* (e.g., MS=44.646*PM−0.4649). Otherwise if the NPPC standard is selected 1514, the LR model for NPPC standard is used to calculate the marbling score 1516*b* (e.g., MS=27.443*PM+0.2172). The predicted marbling score is displayed 1518 on the touch screen of the marbling meter. Other steps may be added to the method 1500. It should be noted that while the method 1500 was described with reference to pork and pork marbling standards, the method 1500 may be modified for other types of meat and meat marbling standards.

Figure 16A:
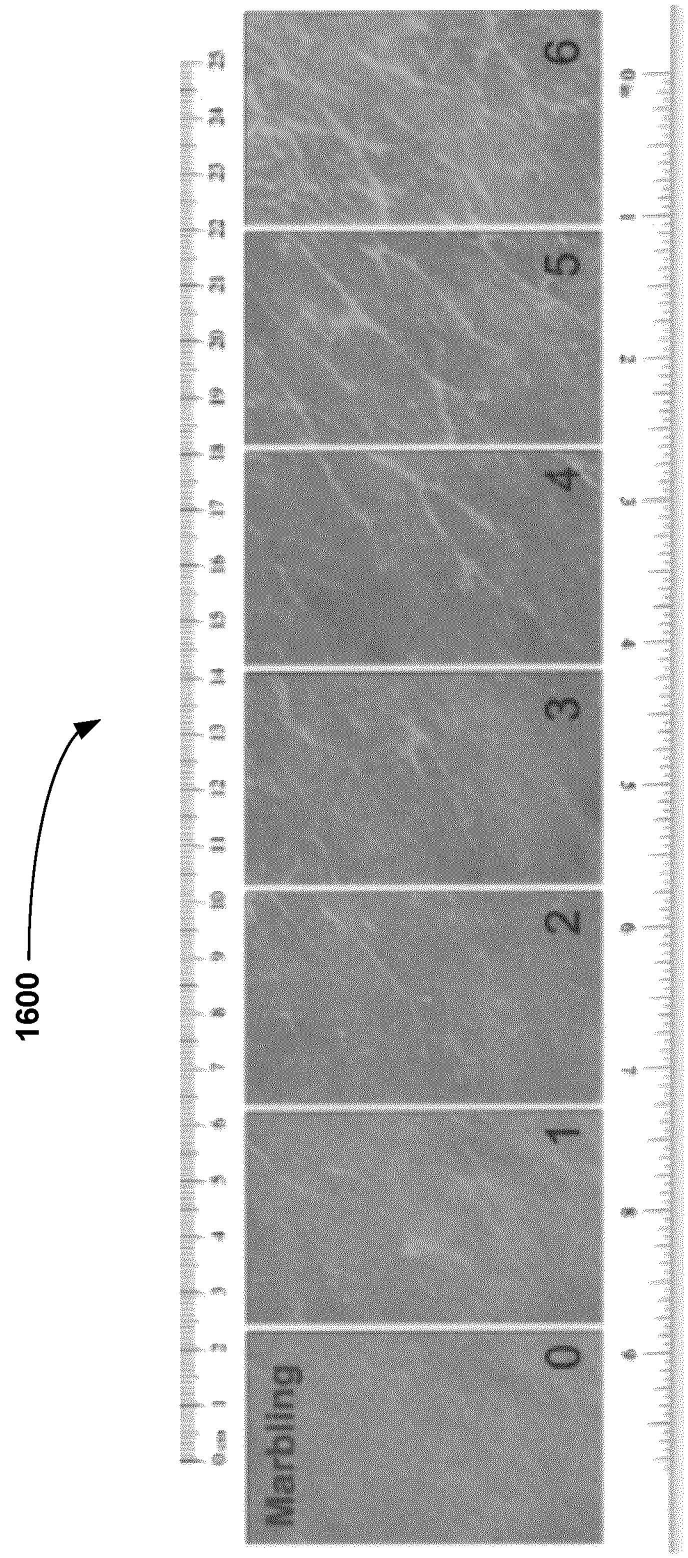
FIGS. 16A and 16B illustrate the CPI and NPPC standard sample images along with their standard ground truth scores, in accordance with some embodiments.
Figure 16B:
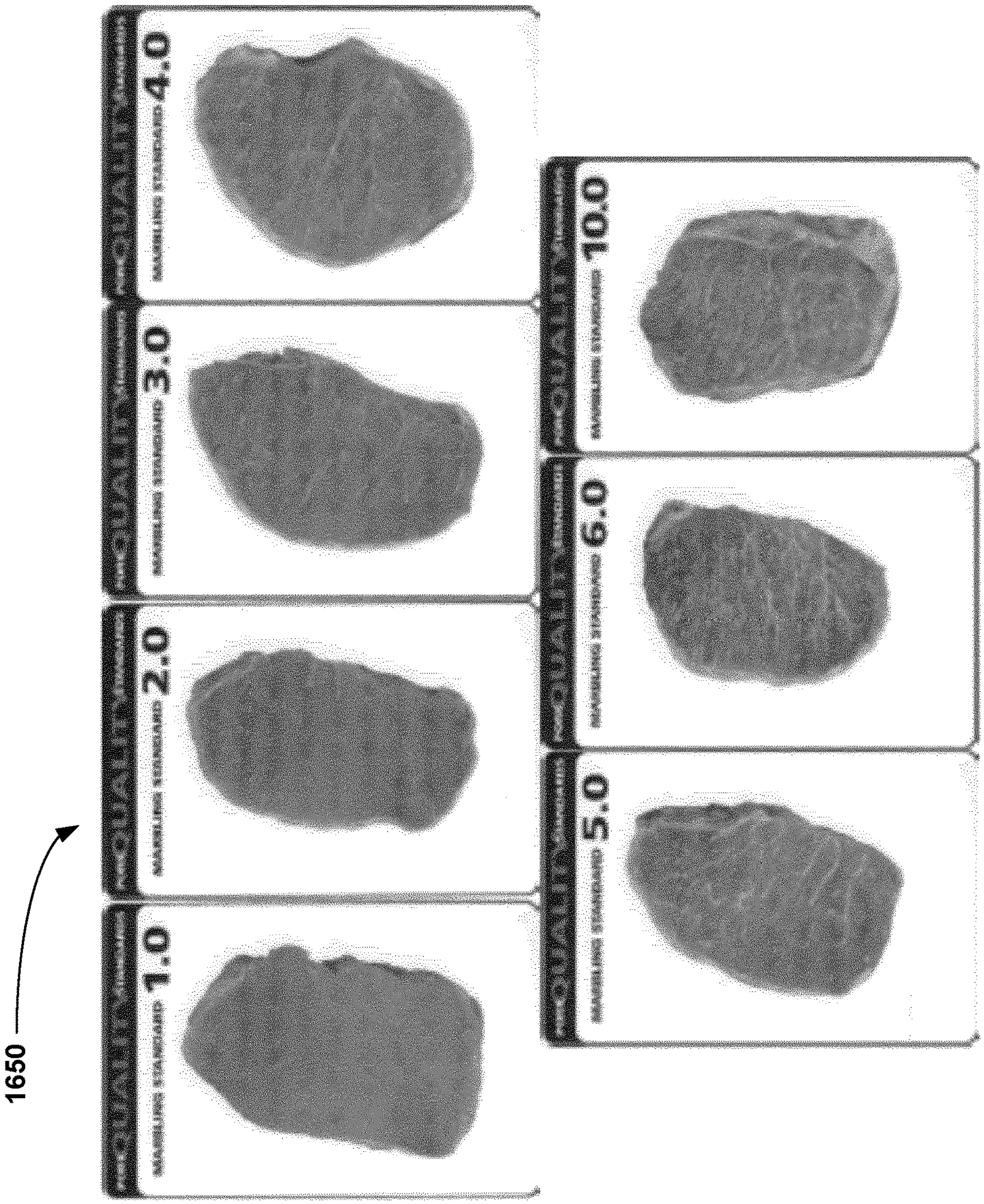

FIGS. 16A and 16B illustrate the CPI 1600 and NPPC 1650 standard sample images along with their standard ground truth scores, in accordance with some embodiments. The CPI standard has label scores ranging from 0 to 6 and NPPC has labels ranging from 1 to 6 and 10.

Digital color images of marbling standards were obtained by scanning the official pork marbling standards with the resolution of 150 dpi (dot per inch) by a scanner, as shown in FIGS. 16A and 16B. The prediction models for pork marbling scores were developed based on the analysis of these digital marbling standard images.

Image preprocessing was conducted on marbling standards to obtain the ROI for marbling detection. The contour of marbling standards, referring to the outer boundary of meat, was obtained by using a thresholding technique and an edge detection algorithm. A thresholding technique transforms a gray-level image (the green channel of marbling standards) to a binary image (i.e., black and white image). The obtained binary images of the marbling standards were used to extract the contour of marbling samples on these standards by employing a Sobel edge detector.

The ROI of marbling standards without the peripheral fat were obtained by shrinking the contour. Each pixel of the contour was moved to the centroid of the contour with a certain distance and the shrunk contour was calculated by the following equations:

$$x_S = x - d_0 \frac{x - x_C}{\sqrt{(x - x_C)^2 + (y - y_C)^2}}, \quad (1)$$

$$y_S = y - d_0 \frac{y - y_C}{\sqrt{(x - x_C)^2 + (y - y_C)^2}},$$

where $$x_C = \frac{1}{N}\sum_{i=1}^{N} x_i,$$

$$y_C = \frac{1}{N}\sum_{i=1}^{N} y_i$$

$(x_c, y_c)$ was the centroid of the contour, (x, y) was the coordinate of the contour pixel, $(x_s, y_s)$ was the coordinate of the shrunk contour pixel, N is the number of pixels of the contour, and $d_0$ was the shrunk distance. The masks for the ROI of marbling standards were thereby obtained by setting pixels inside the shrunk contour open and pixels outside the shrunk contour close.

The ROI for the captured digital colour image was segmented as the AOI in an identified MOI using the dynamic segmentation method 1200.

Since marbling can be regarded as line patterns with different widths, a wide line detector was employed to extract marbling in both the standards and the sample images. The line detection method was implemented based on the comparison of intensity between the center pixel and any other pixel within a circular neighborhood, which was defined as:

$$C(x, y, x_0, y_0; r_d, t) = k_0(x, y, x_0, y_0; r_d) \times s(x, y, x_0, y_0; t), \quad (2)$$

$$s\left(s(x, y, x_0, y_0; t) = \begin{cases} 1, & \text{if } I(x_0, y_0) - I(x, y) \le t, \\ 0, & \text{if } I(x_0, y_0) - I(x, y) > t \end{cases}\right. . \quad (3)$$

$$k_0(x, y, x_0, y_0; r_d) = \frac{k(x, y, x_0, y_0; r_d)}{\sum_{x_0 - r \le x \le x_0 + r, y_0 - r \le y \le y_0 + r} k(x, y, x_0, y_0, r_d)}, \quad (4)$$

$$k\left(s(x, y, x_0, y_0; r_d) = \begin{cases} 1, & \text{if } I1, \text{if} (x - x_0)^2 + (y - y_0)^2 \le r_d^2, (x_0, y_0) - I(x, y) \le t, \\ 0, & \text{otherwise}, \end{cases}\right. \quad (5)$$

where ($x_0$, $y_0$) is the coordinate of the center of the circular neighborhood, (x, y) is the coordinate of any other pixel within the neighborhood, $r_d$ is the radius of the circular neighborhood, t is the intensity contrast threshold, I(x, y) is the intensity of the pixel (x, y), $k_0$ is the normalized circular neighborhood defined by k, s defines the measure of similarity between the center pixel and any other pixel, and c is the output of the weighting comparison.

This comparison was implemented for each pixel within the circular neighborhood and the mass of the neighborhood center ($x_0$, $y_0$) was given by $$M(x_0, y_0; r, t) = \sum_{x_0 - r \le x \le x_0 + r}^{y_0 - r \le y \le y_0 + r} c(x, y, x_0, y_0; r, t). \quad (6)$$

The output of the wide line detector on the neighborhood center ($x_0$, $y_0$) was the inverse mass obtained by:

$$L(x_0, y_0; r, t) = \begin{cases} g - m(x_0, y_0; r, t & \text{if } m(x_0, y_0) < g, \\ 0, & \text{otherwise.} \end{cases} \quad (7)$$

Here, g is the geometric threshold and $g = m_{max}/2$, where $m_{max}$ is the maximum value which m can take. As a normalized circular mask is used, $m_{max}$ is not larger than but very close to unity and thereby the initial response ranges from 0 to 0.5.

The initial response of the pixel in ROI was determined by two parameters—the radius of the circular neighborhood $r_d$ and the intensity contrast threshold t, according to equation 7 above. In a gray-level image, the radius of the circular neighborhood $r_d$ reflects the maximum width of lines of interest that is related to the scale and resolution of the image, while the intensity contrast threshold t depends on the contrast of the image that is greatly influenced by the lighting condition. Since the marbling meter has an enclosed and well controlled imaging environment, the scale, resolution and contrast of meat images vary little between different meat samples. Therefore, the same radius of the circular neighborhood $r_d$ and same intensity contrast threshold t are used for meat sample images. Accordingly, the radius of the circular neighborhood $r_d$ was related to the maximum width of lines of interest among all three channels of the image. The intensity contrast threshold at each channel, ICTc, was defined by:

$$ICT_c = \begin{cases} \text{round}\left(\frac{std(ROI_c)}{STD}\right., & \text{if } STD > 1, \\ \text{round}\ (std(ROI_c)), & \text{otherwise} \end{cases} \quad (8)$$

$$STD = \underset{i}{std}\,(std(ROI_i)), \quad (9)$$

where $ROI_c$ is the ROI at channel C, STD is the standard deviation over all standard deviations of all channels, and round stands for the nearest integer.

Figure 17:
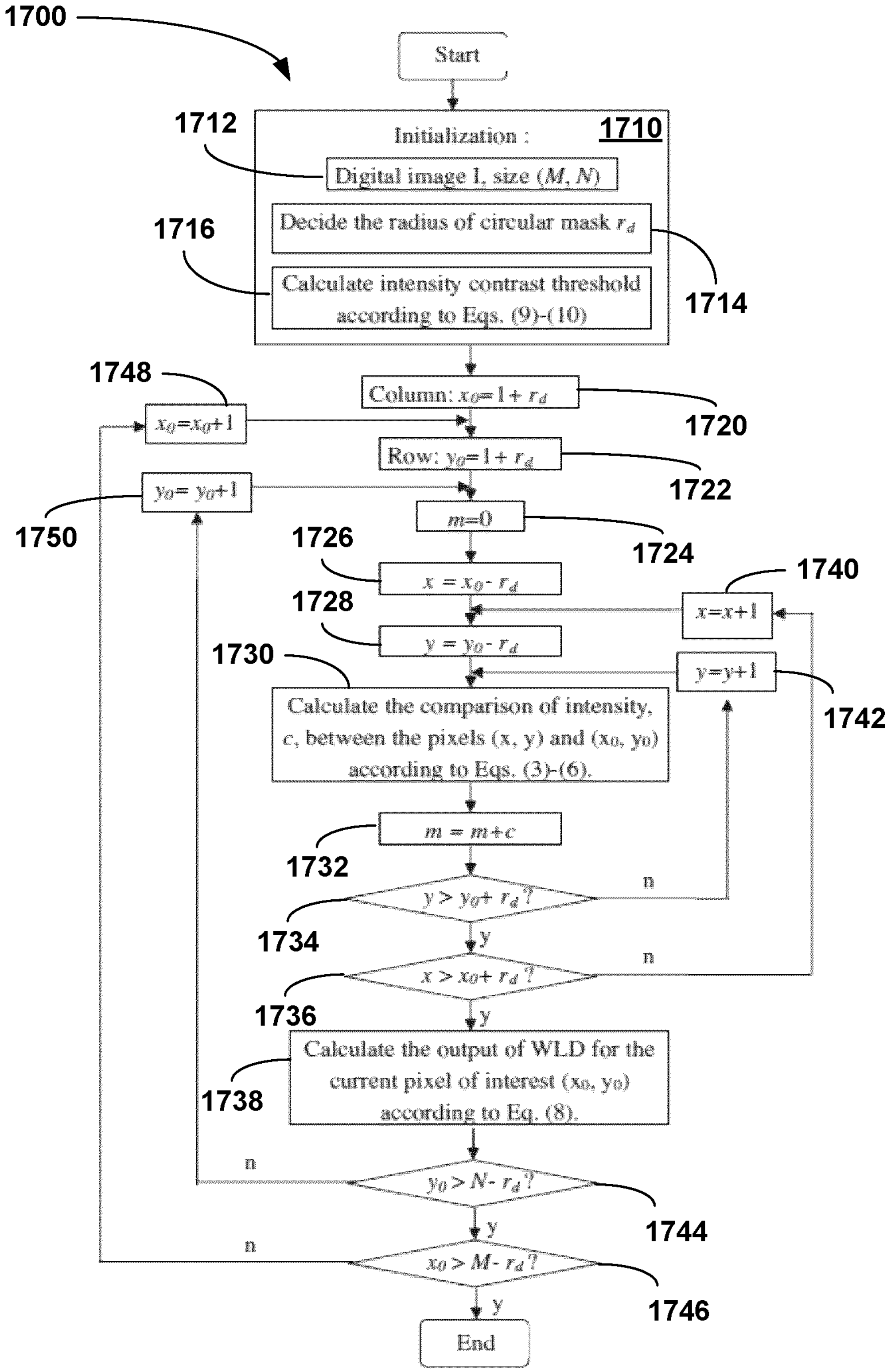
FIG. 17 illustrates the assessment procedure of marbling scores using the marbling meter device, in accordance with some embodiments.

FIG. 17 illustrates, in a flowchart, an example of a method for detecting wide lines 1700, in accordance with some embodiments. The method 1700 is initialized 1710 with a digital image I of size (M, N) 1712. The radius of a circular mask $r_d$ is determined 1714. The intensity contrast threshold is calculated 1716 according to equations 8 and 9 above. Next, Column is set 1720 to $x_0=1+r_d$ and Row is set 1722 to $y_0=1+r_d$. m is set 1724 to 0, x is set 1726 to $x_0=r_d$ and y is set 1728 to $y_0-r_d$. The comparison of intensity, c, between pixels (x, y) and ($x_0$, $y_0$) is calculated 1730 according to equations 2 to 5 above. m is set 1732 to m+c. If $y>y_0+r_d$ 1734, then if $x>x_0+r_d$ 1736, then the output of WLD is calculated 1738 for the current pixel of interest ($x_0$, $y_0$) according to equation 7 above. Otherwise 1736, x is incremented 1740 (x=x+1) and step 1728 is repeated. Otherwise 1734, y is incremented 1742 (y=y+1) and step 1730 is repeated. After the WLD is calculated 1730, if $y_0>N-r_d$ 1744, then if x0>M−rd 1746, then the wide line is detected and the method 1700 is done. Otherwise 1746, $x_0$ is incremented 1748 ($x_0=x_0+1$) and step 1722 is repeated. Otherwise 1744, $y_0$ is incremented 1750 ($y_0=y_0+1$) and step 1724 is repeated.

In the post-processing stage, the initial response was binarilized by a global thresholding. The final result, i.e., the detected marbling, was then obtained by performing a morphological operation on the thresholded image to remove objects too small to be of interest. There were two parameters required for post-processing: one is thresh, the global threshold for binarilization of initial response; the other is area, the maximum number of pixels of an object which would be removed from the thresholded image.

The definition of the proportion of marbling, PM, was given by:

$$PM = \frac{\text{area (marblings)}}{\text{area } (ROI)}, \quad (10)$$

where area(marblings) denotes the number of pixels of detected marbling in a standard marbling image or a sample image, and area(ROI) is the number of pixels of the corresponding ROI. The PM of standard marbling images was used for building the prediction model of pork marbling scores.

Pearson's correlation coefficients between marbling scores and standards' PM at three channels are calculated. The channels having PM with high correlation coefficients and the 0.0500 significance level are selected as the potential variables of the stepwise procedure.

Stepwise procedure, also called stepwise regression, is an automatic procedure for statistical model selection by adding and removing variables from a model based on their statistical significance in a regression. The p-value of an F-statistic is calculated as the entrance/exit criterion of potential variables for the models after the initial model is decided. The procedure may build different models from the same set of potential variables due to various variables included in the initial model. The procedure terminates when no entrance or exit of variables improves the model.

A multiple linear regression (MLR) model was selected as the initial model for the stepwise procedure, which was defined as:

$$\hat{Y} = a_0 + \Sigma_{c=r,g,b} a_c PM_c \quad (11)$$

where $\hat{Y}$ is the vector of predicted marbling scores, $PM_c$(c=r, g, b) is the vector of marbling standards' PM at the channel C, $a_0$ is the constant term and ac is the regression coefficient of the variable $PM_c$. Each potential variable was used as the first entry into the initial model to build multilinear models for predicting pork marbling scores.

Leave-one-out cross validation (LOO) was employed to assess how the multilinear models will generalize to an independent data set, as well as the random partition validation method which can give more robust results. For each multilinear model developed by the stepwise procedure, every marbling standard in the standardized chart system was used once as the validation data and the corresponding remaining marbling standards as the training data. The qualities of multilinear models were evaluated by the coefficient of determination ($R^2$), the adjusted $R^2$, the root mean square error of LOO (RMSECVL). The best model should have the lowest RMSECVL, the highest $R^2$/adjusted $R^2$, and a smallest difference between $R^2$ and adjusted $R^2$.

Figure 18A:
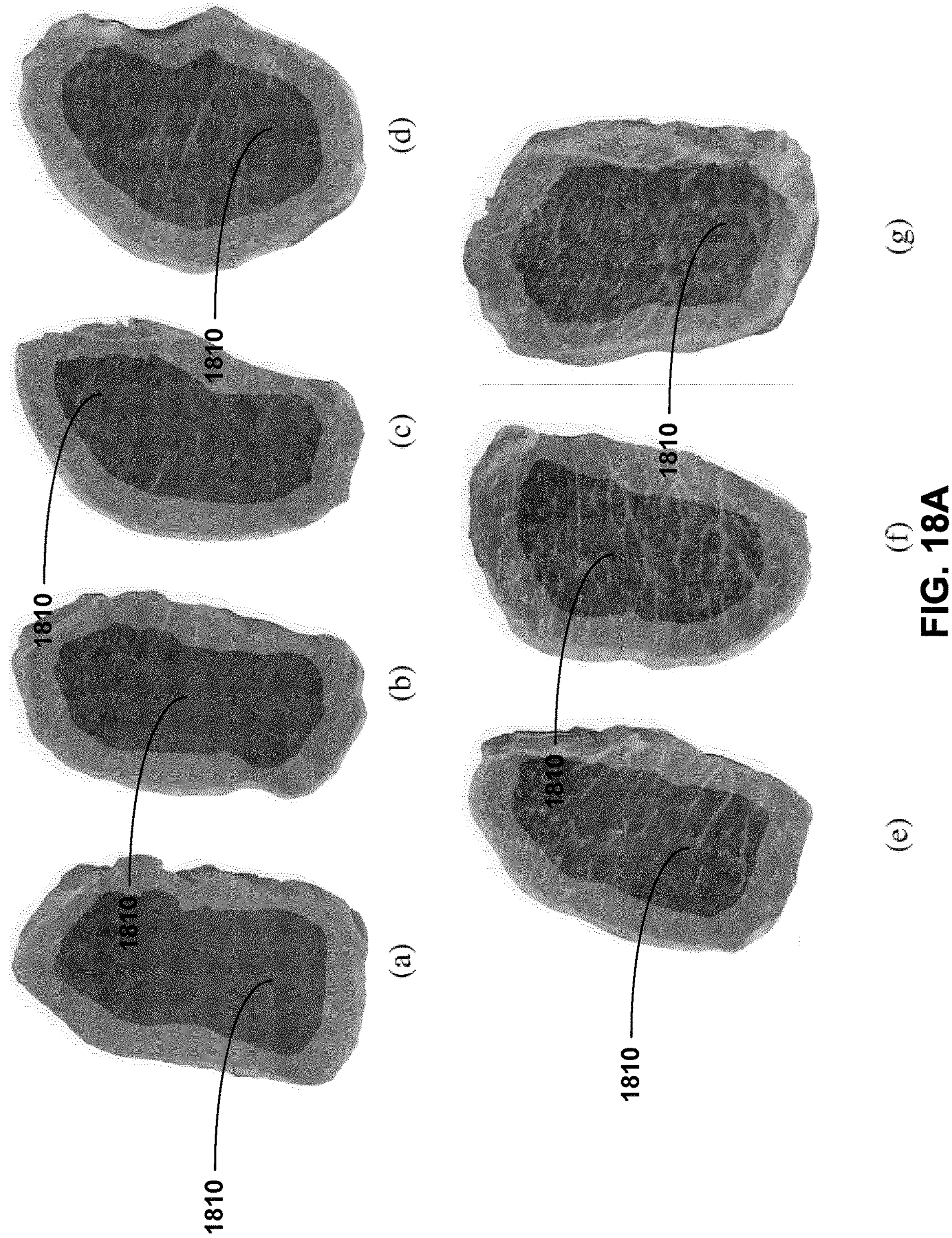
FIG. 18A illustrates examples of regions of interest (ROI) of pork marbling standard (i.e., the AOI within the MOI), in accordance with some embodiments.

FIG. 18A illustrates examples of regions of interest (ROI) 1810 of pork marbling standard, in accordance with some embodiments. The region of interest (ROI) 1810 of each marbling standard as conducted by applying equation 1 for the green channel with a fixed shrunk distance $d_0$ (100 pixels) is shown. The wide line detector defined by equations 2 to 7 above was applied on the ROI at each channel (the red, green, and blue channel of a digital color image) to obtain the corresponding initial response of marbling.

Figure 18B:
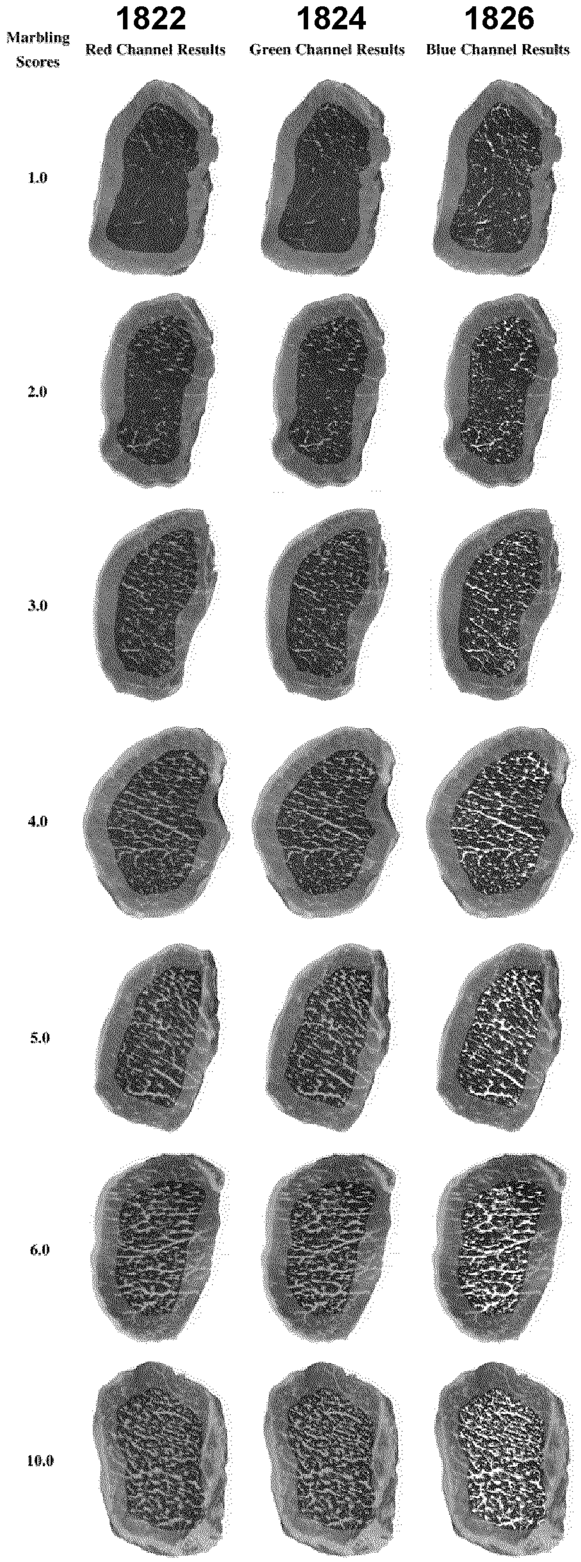
FIG. 18B illustrates the final extraction results of marbling for the NPPC standards at the three channels, in accordance with some embodiments.

FIG. 18B illustrates the final extraction results of marbling for all standards at the three channels, in accordance with some embodiments. Extraction results of pork marbling standards at three channels which are displayed in orange 1822, green 1824 and yellow 1826 for the red, green and blue channels, respectively.

The PM of marbling standards at each channel monotonously increased with the marbling scores. Pearson's correlation coefficients between marbling scores and PMs are very high for all three channels ($r>=0.99$, $p<0.0001$). This indicates that PM of marbling standards at each channel is strongly correlated with the marbling scores. Therefore, supervised machine learning algorithms such as linear regression analysis may be used to train the marbling prediction models for different standards. An exhausted forward selection stepwise procedure may be employed to select the potential predictive variables from all three channels.

In the stepwise procedure, PM at each channel was used separately as the first entry into the initial model defined by equation 11 above to build different multilinear models for pork marbling score prediction. Tables 1 and 2 list the regression coefficients of the multilinear models with different first entry variables based on the CPI standards and NPPC standards, respectively.

TABLE 1

Regression coefficients of multilinear models from the stepwise procedure with different first entry variables based on the CPI standards

| Initial Variables | Models | $a_0$ | $a_r$ | $a_g$ | $a_b$ |
|---|---|---|---|---|---|
| Red channel | MLR_RGB | −0.6130 | −19.9313 | 45.9455 | 7.7377 |
| Green channel | LR_G | −0.4649 | 0 | 44.646 | 0 |
| Blue channel | LR_B | −0.1116 | 0 | 0 | 46.4824 |
| None | LR_B | −0.1116 | 0 | 0 | 46.4824 |

TABLE 2

Regression coefficients of multilinear models from the stepwise procedure with different first entry variables based on the NPPC standards

| Initial Variables | Models | $a_0$ | $a_r$ | $a_g$ | $a_b$ |
|---|---|---|---|---|---|
| Red channel | MLR_RGB | 0.3157 | 19.3392 | −1.7600 | 16.3117 |
| Green channel | LR_G | 0.2171 | 0 | 27.4431 | 0 |
| Blue channel | LR_B | 0.3141 | 0 | 0 | 32.4805 |
| None | LR_B | 0.3141 | 0 | 0 | 32.4805 |

In addition, Tables 1 and 2 also list the selected model with no first entry variable forced into the initial model. The use of first entry variables at the green channel and the blue channel led to simple linear models, LR_G and LR_B, respectively, while the use of first entry variables at the red channel resulted in the multiple linear model, MLR_RGB, which included all the potential variables. The LR_B model was obtained again when no variable was forced into the initial model at the beginning of the stepwise procedure. This indicated that the PM obtained from the green and blue channels might have more explanatory power, while the PM from the red channel did not have enough explanatory power to build a model independently.

The performances of the three multilinear models given as $R^2$, adjusted $R^2$, and RMSECVL in Tables 3 and 4 for the CPI standards and NPPC standards, respectively. The most successful model for the CPI standards is LR_G with the highest adjusted $R^2$=0.978 and lowest RMSECVL=0.319, while the most successful model for the NPPC standards is MLR_RGB with the highest $R^2$=0.998, highest adjusted $R^2$=0.995 and lowest RMSECVL=0.126. Notice that the linear regression model at the green channel LR_G has a very similar performance to the model MLR_RGB for the NPPC standards as shown in Table 4. Considering the computing cost of marbling detection at three channels, the linear regression model LR_G is used in the software of the Marbling Meter to assess marbling scores for both CPI and NPPC standards.

TABLE 3

Performance evaluation of the regression models for the CPI standards

| Models | $R^2$ | Adjusted $R^2$ | RMSECVL |
|---|---|---|---|
| MLR_RGB | 0.984 | 0.969 | 0.382 |
| LR_G | 0.982 | 0.978 | 0.319 |
| LR_B | 0.966 | 0.96 | 0.433 |

TABLE 4

Performance evaluation of the regression models for the NPPC standards

| Models | $R^2$ | Adjusted $R^2$ | RMSECVL |
|---|---|---|---|
| MLR_RGB | 0.998 | 0.995 | 0.126 |
| LR_G | 0.994 | 0.992 | 0.167 |
| LR_B | 0.981 | 0.977 | 0.285 |

Based on the training set PMs and their labeled scores a weighted parametric linear regression model was built. The values of the weights were obtained by reducing the squared error between actual output and predicted output and keeping the value of $R^2$ near to 1.

In one embodiment, the regression equation for CPI standards is:

$$MS_{cpi}=44.646*PM-0.4649 \quad (12)$$

In one embodiment, the regression equation for NPPC standard is:

$$MS_{nppc}=27.443*PM_{mat}+0.2172 \quad (13)$$

The weighted parametric linear regression models (12) and (13) are the benchmark models for the CPI and NPPC standards, respectively. For a particular breed and/or pork processing plant, the benchmark model is the initial version of the marbling predictive model that is used for pork marbling assessment. The marbling predictive model may be retrained and updated regularly and iteratively based on new collected data (i.e., pork images, actual and predicted marbling scores) using supervised machine learning algorithms. It should be understood that while examples of pork marbling models and standards are described herein, the teachings may also apply to other types of meat marbling and meat standards.

FIGS. 19A to 19F illustrate the assessment procedure of pork marbling scores using the marbling meter device 300, in accordance with some embodiments.

Figure 19A:
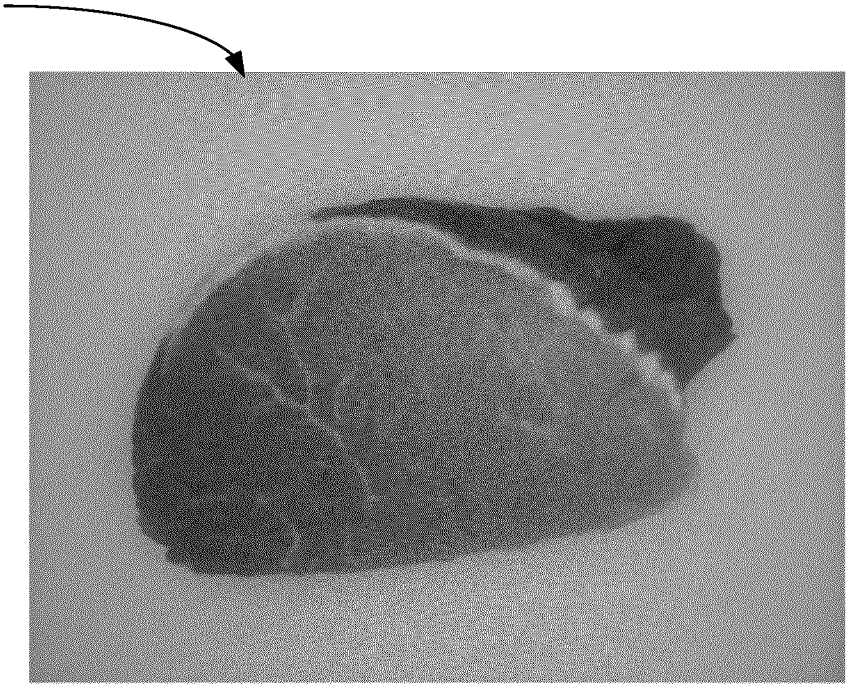
FIGS. 19A to 19F illustrate the assessment procedure of marbling scores using the marbling meter device, in accordance with some embodiments.
Figure 19B:
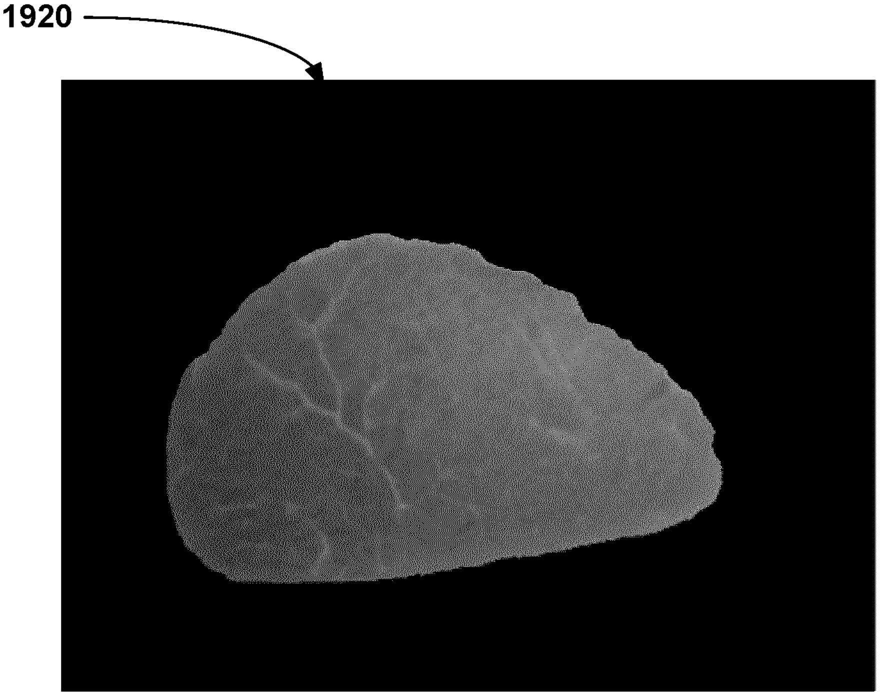
Figure 19C:
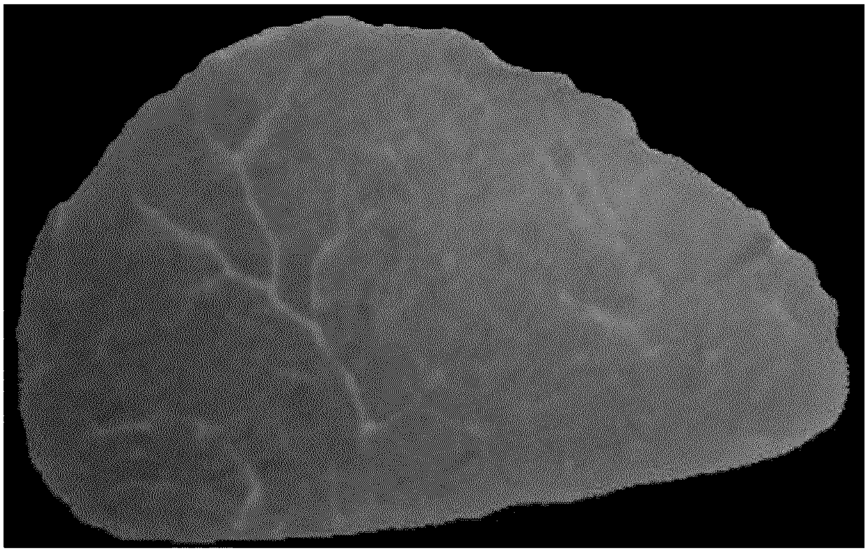
Figure 19D:
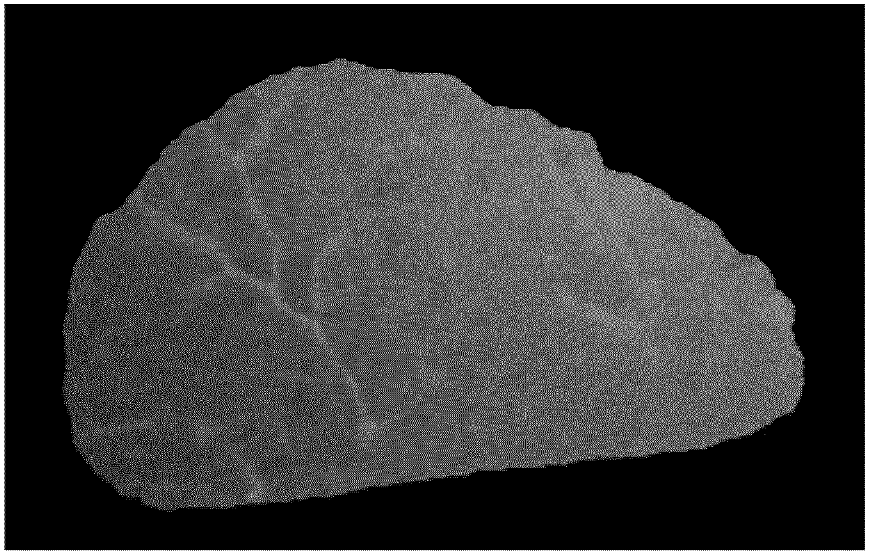
Figure 19E:
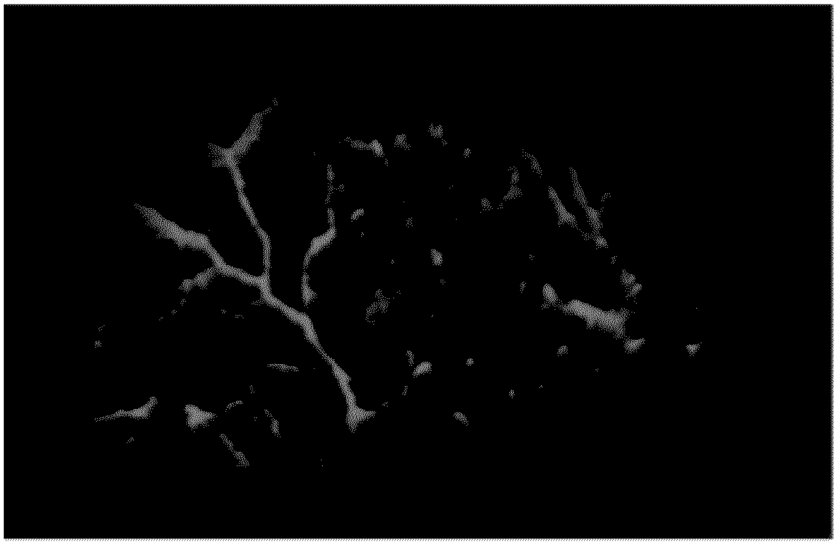
Figure 19F:
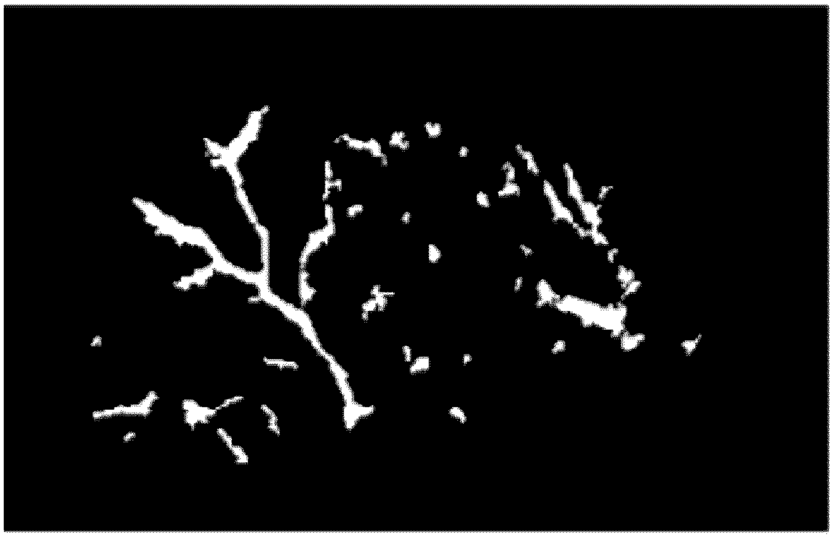

FIG. 19A illustrates an example of a pork image 1910, in accordance with some embodiments. FIG. 19B illustrates an example of a masked image 1920 which is the identified muscle of interest (MOI) of the input image 1910 using the segmentation method 1200, in accordance with some embodiments. FIG. 19C illustrates an example of a cropped segmented image 1930 in accordance with some embodiments. FIG. 19D illustrates an example of the segmented ROI of the pork image 1940, i.e., the segmented AOI in the MOI using the segmentation method 1200, in accordance with some embodiments. FIG. 19E illustrates an example of detected line response C 1950 in the ROI, which is a scored image, in accordance with some embodiments. FIG. 19F illustrates an example of determined marblings BW 1960 in the ROI, which is a binary image, in accordance with some embodiments. From this BW 1960, a marbling score is calculated based on the regression model. For this specific image 1960, the marbling score was 3.74 with the CPI standard, and 2.8 with the NPPC standard.

FIGS. 20A to 20G illustrate, in screen captures, an example of a use case of the device 300, in accordance with some embodiments. It should be understood that while the example is described with respect to pork, the example may apply to other types of meat.

Figure 20A:
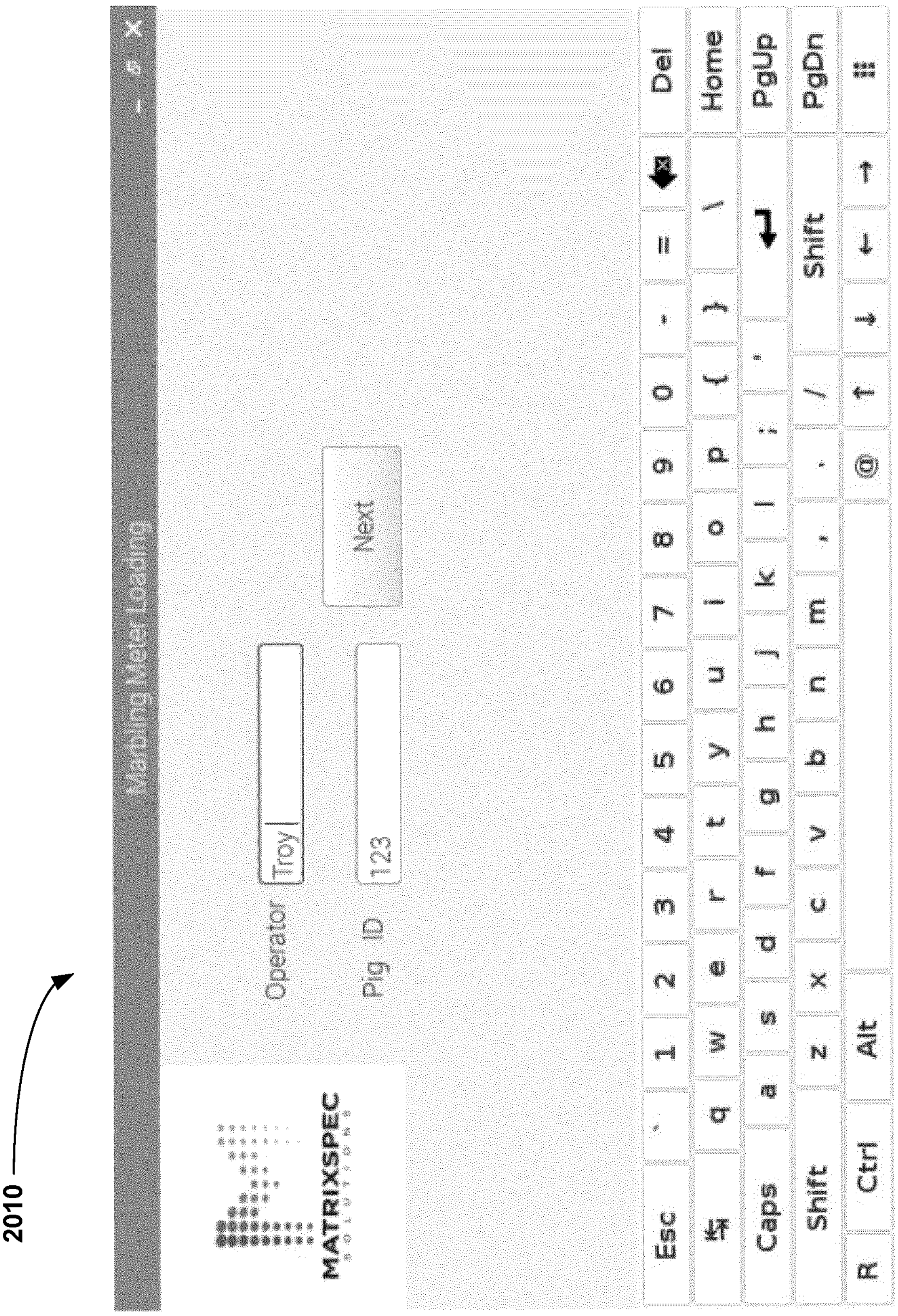
FIGS. 20A to 20G illustrate, in screen captures, an example of a use case of the device, in accordance with some embodiments.

FIG. 20A illustrates an example of a loading page 2010, in accordance with some embodiments. The loading page 2010 will ask for the Operator ID and Pig ID. This will provide who is operating the device and which pig samples are being used. The virtual keyboard in the loading page will for the inputting of the text and number in the dialog box.

Figure 20B:
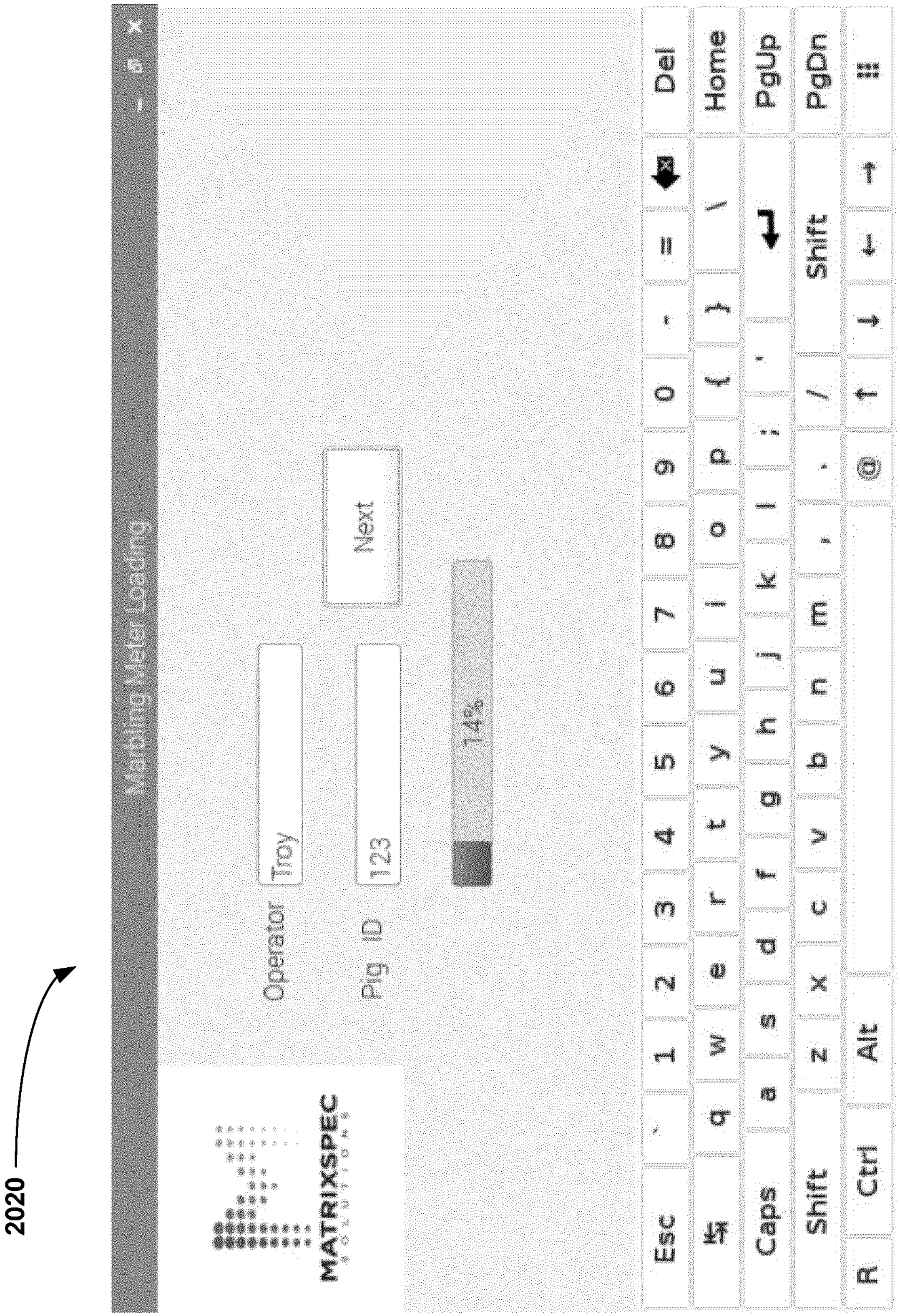

FIG. 20B illustrates an example of a marbling meter application launch page 2020, in accordance with some embodiments. After providing the Operator name and Pig ID, when the 'Next' button is selected, the Marbling Meter App will start loading. Meanwhile, the software will use this period time to load all the libraries needed and switch on the LED lights 292.

Figure 20C:
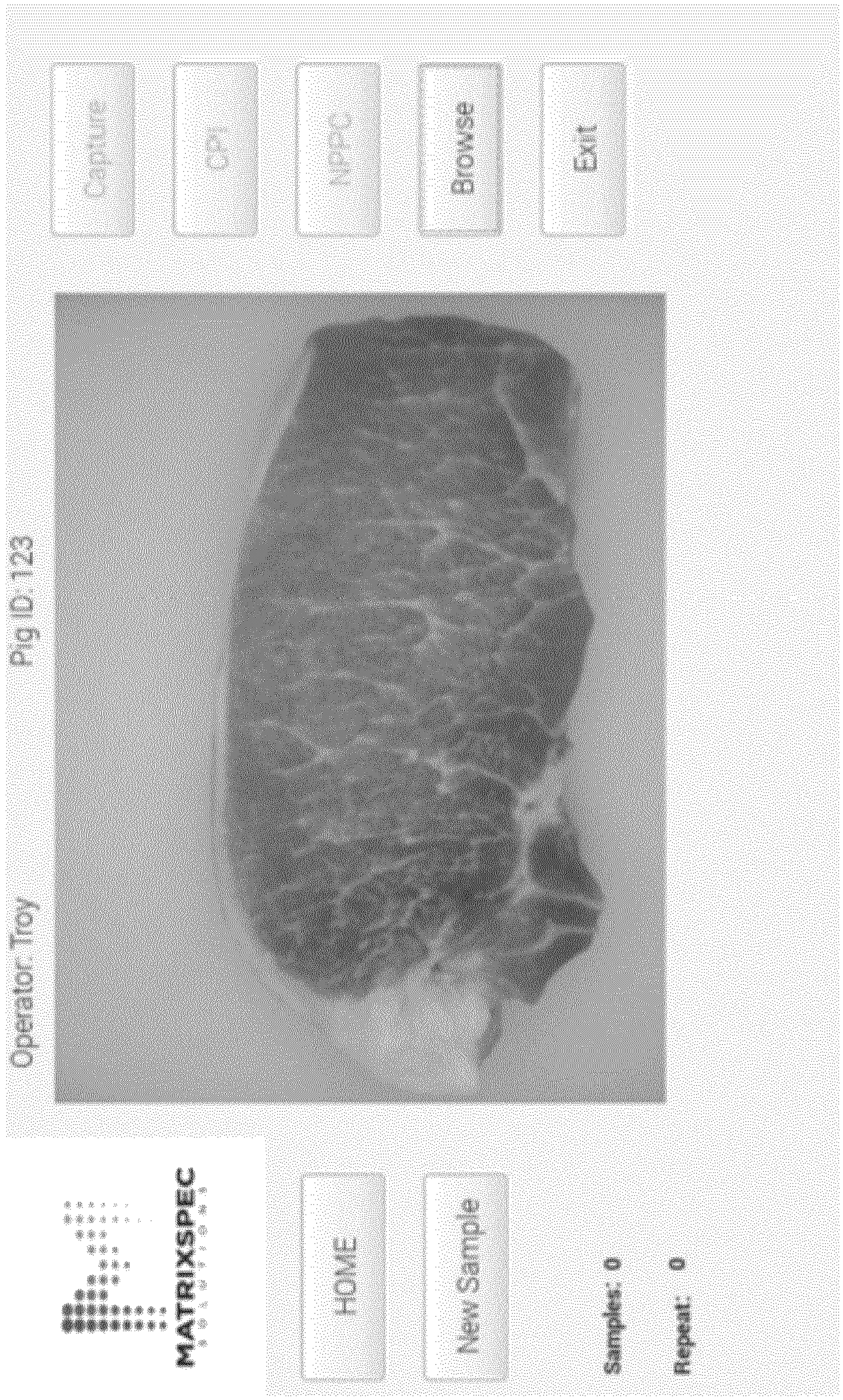

FIG. 20C illustrates an example of an application main page after launch 2030, in accordance with some embodiments. After loading page, the program enters the main operation page. A user may capture sample images and calculate marbling scores. The live video in the middle of the screen shows the field of view of the camera. After placing a pork sample on the drawer, the end user can check the sample position through the live video and adjust it if necessary. The current Operator and Pig ID displays on top of the live video, while the Sample ID and Scan Number shows on the left side of the live video. The sample ID will be automatically assigned for the pork samples. For each Pig ID, the initial Sample ID is '1' and will automatically add 1 every time pressing the button of 'New Sample'. When the Pig ID changes, the Sample ID will be automatically initialized and set up as '1' again. Table 5 describes example function descriptions for buttons on the application main page.

TABLE 5

Function description for Buttons on Application Main Page

| Button Name | Description |
|---|---|
| New Sample | "New Sample" button allows you to provide sample ID starting from 1 |
| Capture | "Capture" button allows you to capture a new pork sample image. |
| Re-Capture | "Re Capture" button allows you to repeat capturing images of the same sample. By default, in the beginning, it is behinds the"Capture" button. If you recapture, repeat times will be displayed in the Repeat dialog box. The Repeat dialog box starts from number 0 for no recapture, and 1 for the first recapture, and so on . . . |
| CPI | After capturing the image, press this button to calculate CPI marbling score. CPI is Canadian standard. Scores will be automatically saved to the database. Gray color represents this button is not available. |
| NPPC | After capturing the image, press this button to calculate NPPC marbling score. NPPC is the short name of National Pork Producers Council. Scores will be automatically saved to the database. Gray color when disable. |
| Browse | Pressing this button will lead you to browse page, where you can browse through stored images and see marbling score and ID of those images. |
| Exit | Exits the app, switch off all lights. |

Figure 20D:
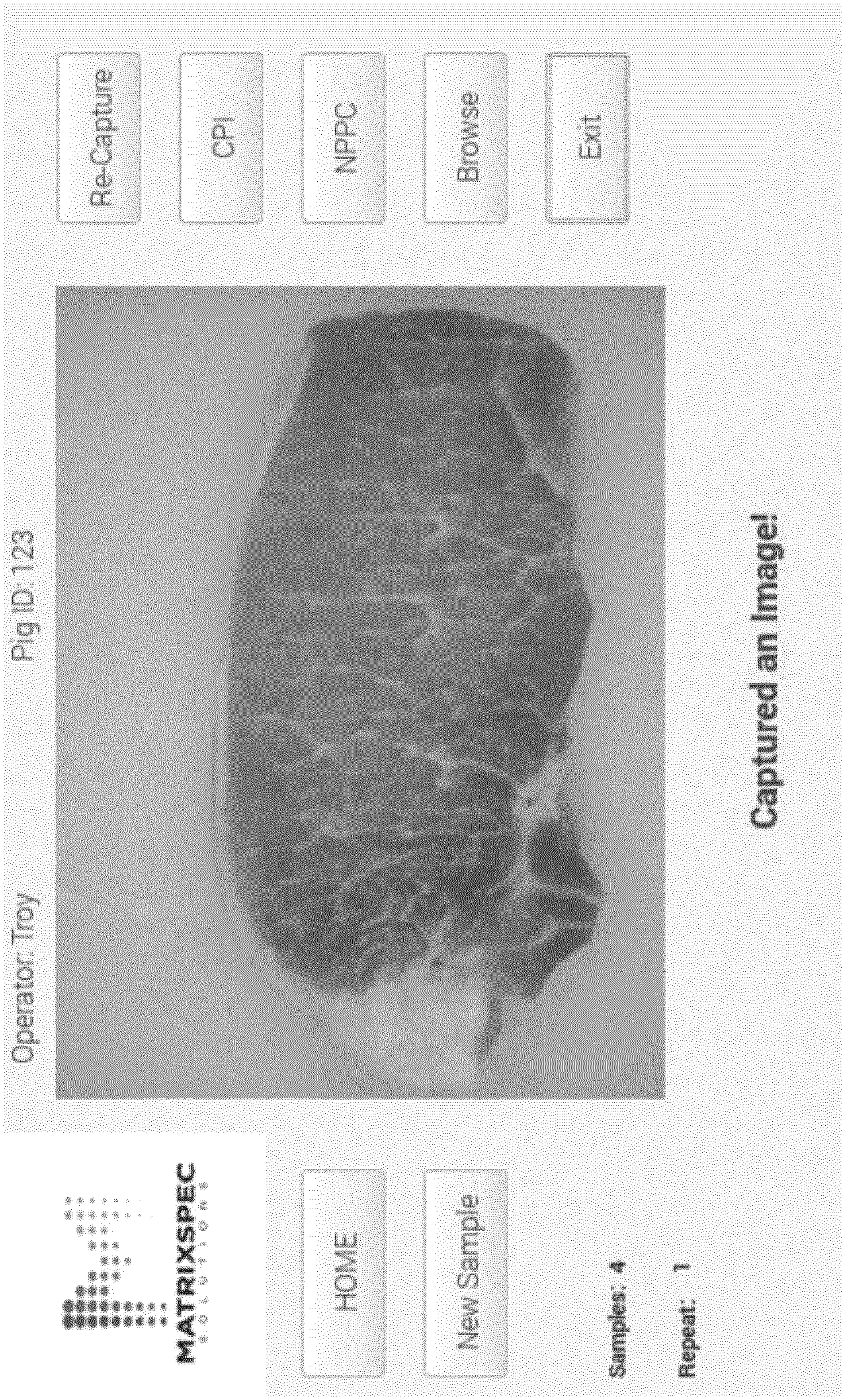

FIG. 20D illustrates an example of an application main page after capturing a pork image 2040, in accordance with some embodiments.

Figure 20E:
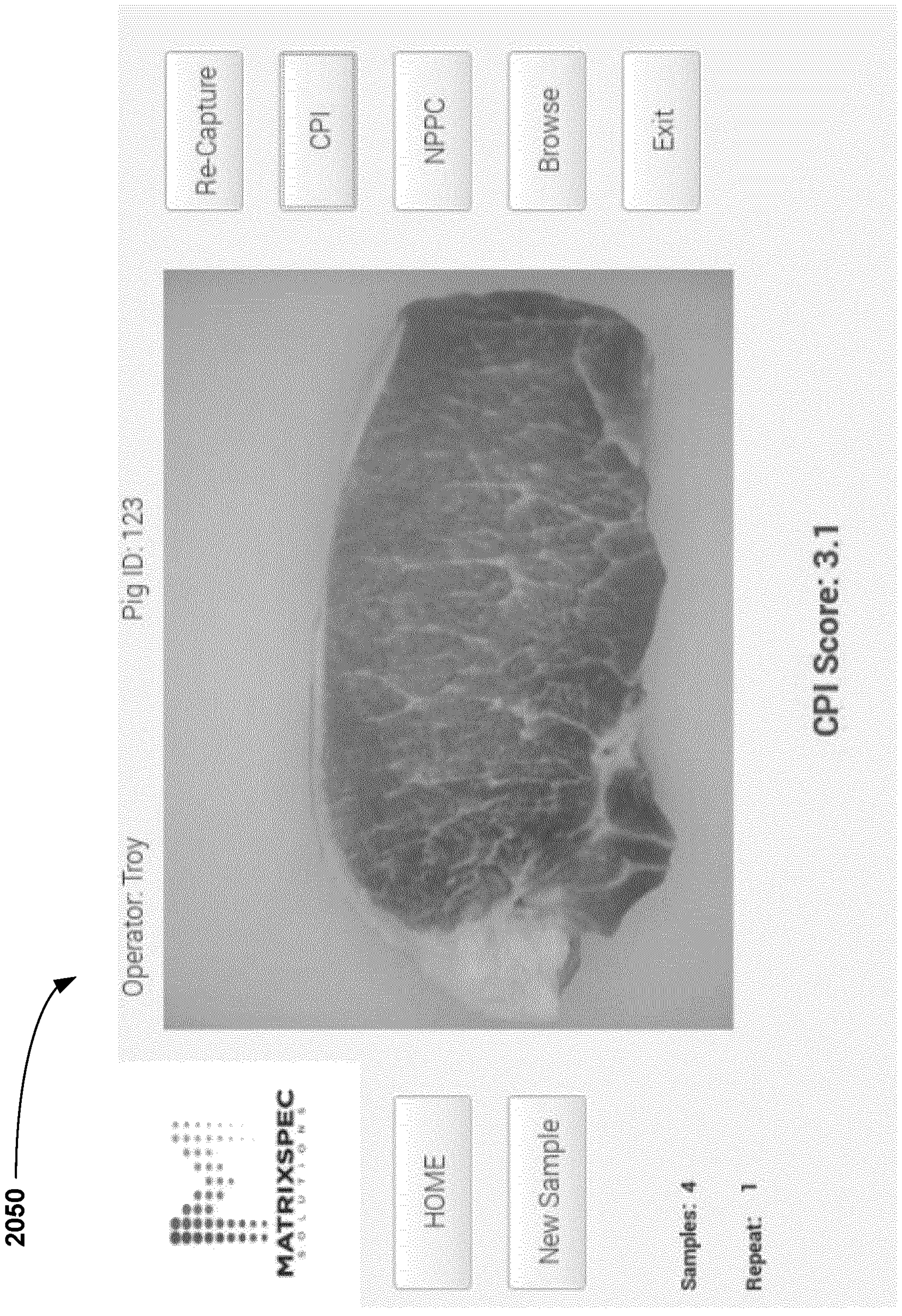

FIG. 20E illustrates an example of an application main page showing a predicted CPI score 2050, in accordance with some embodiments.

Figure 20F:
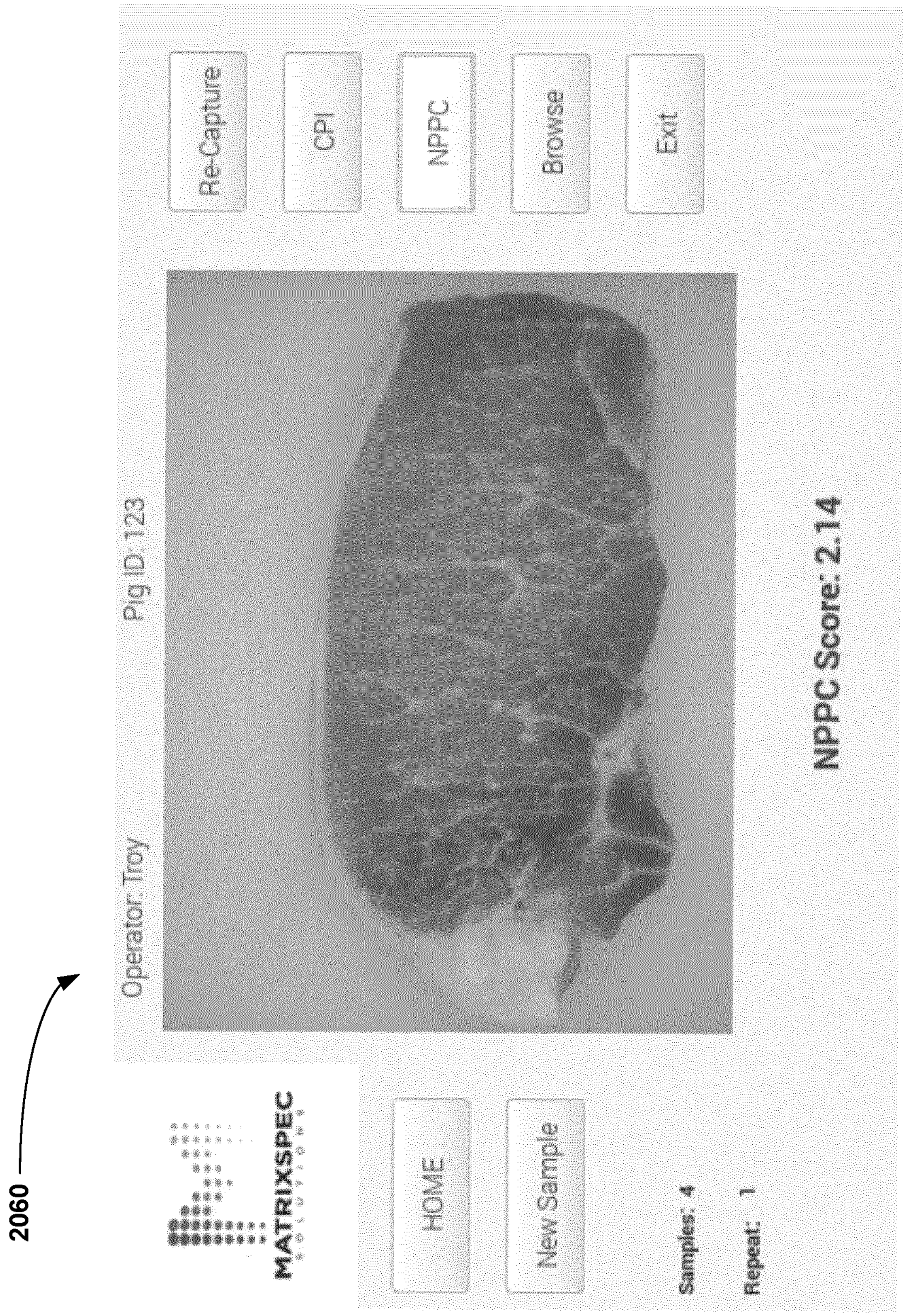

FIG. 20F illustrates an example of an application main page showing a predicted NPPC score 2060, in accordance with some embodiments.

Figure 20G:
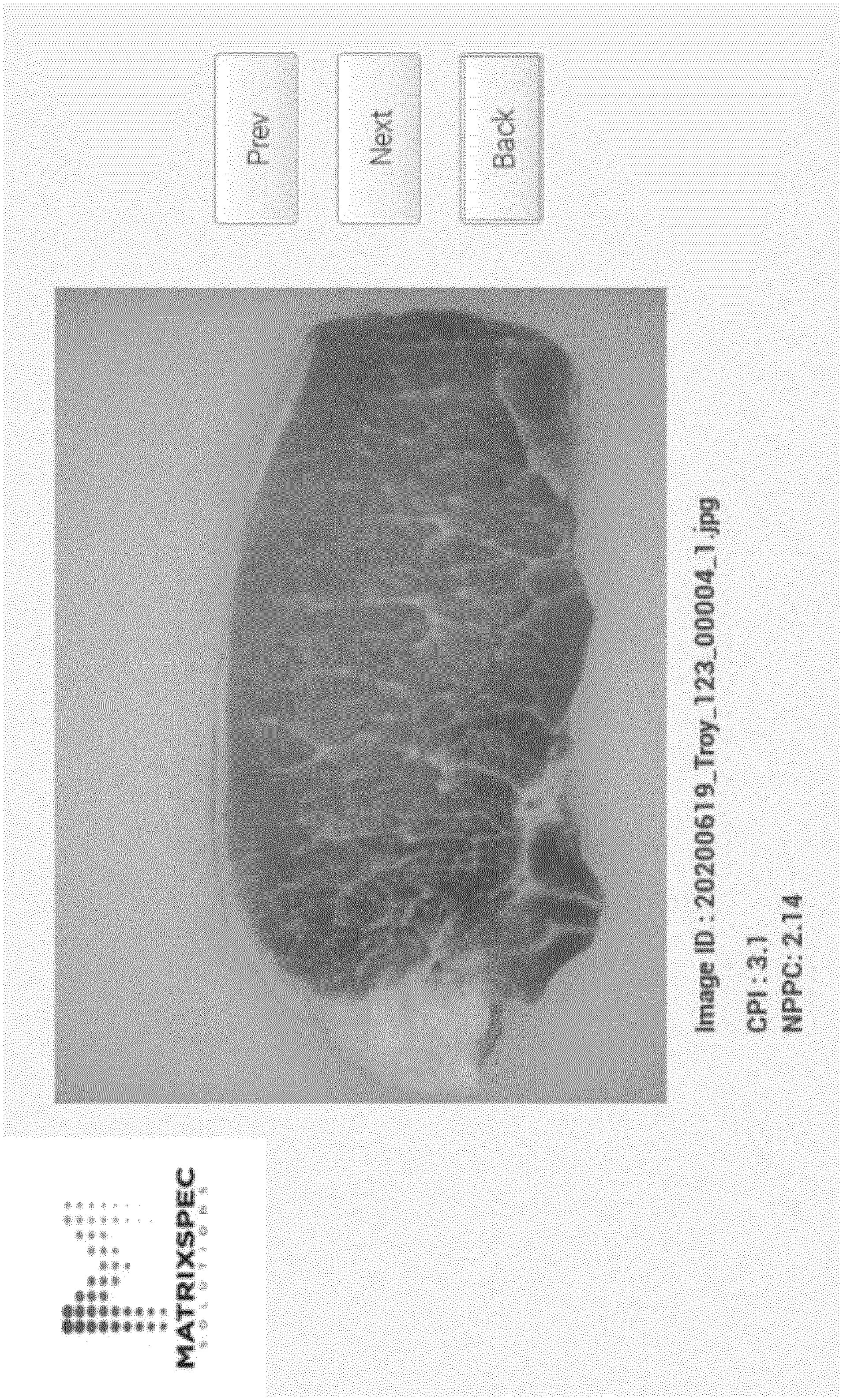

FIG. 20G illustrates an example of a browse page 2070, in accordance with some embodiments. The Browse Page 2070 allows the end user to browse the history pork images and their cores. The end user can check the previous images and the next images by pressing the 'Prev' and 'Next' buttons, respectively.

FIGS. 21A to 21E illustrate, in screen shots, an example of a use case of the device app 240, in accordance with some embodiments. It should be understood that while the example is described with respect to pork, the example may apply to other types of meat.

Figure 21A:
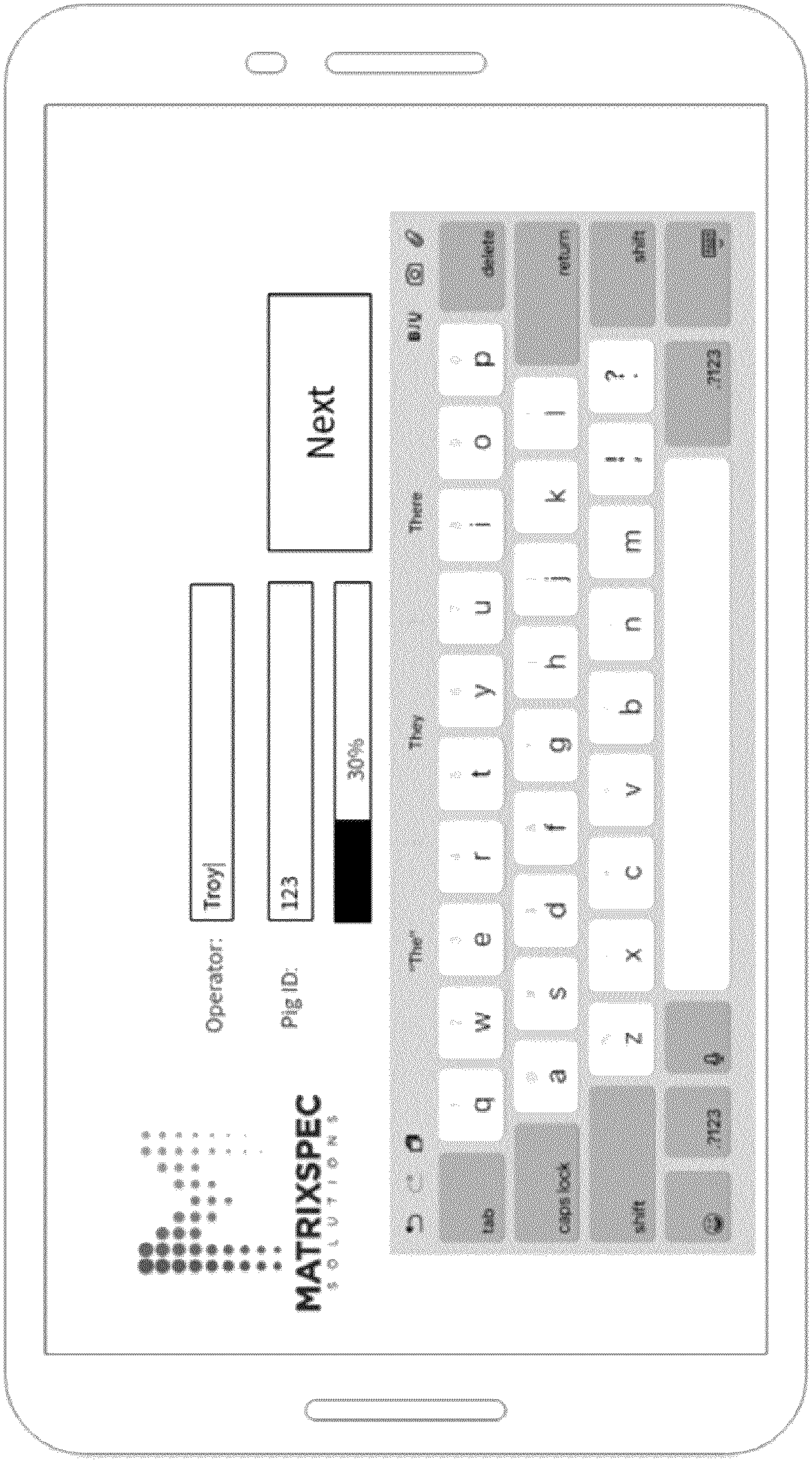
FIGS. 21A to 21E illustrate, in screen captures, an example of a use case of the device app, in accordance with some embodiments.

FIG. 21A illustrates an example of a loading page 2110, in accordance with some embodiments. Table 6 describes example function descriptions for field on a loading page.

TABLE 6

| Function description for Fields on Loading Page | |
|---|---|
| Button/ Text Field | Description |
| Operator | User needs to input operator id. |
| Pig ID | Operator needs to input pig id. |
| Next | Pressing Next button will take the user to the next screen. |

Figure 21B:
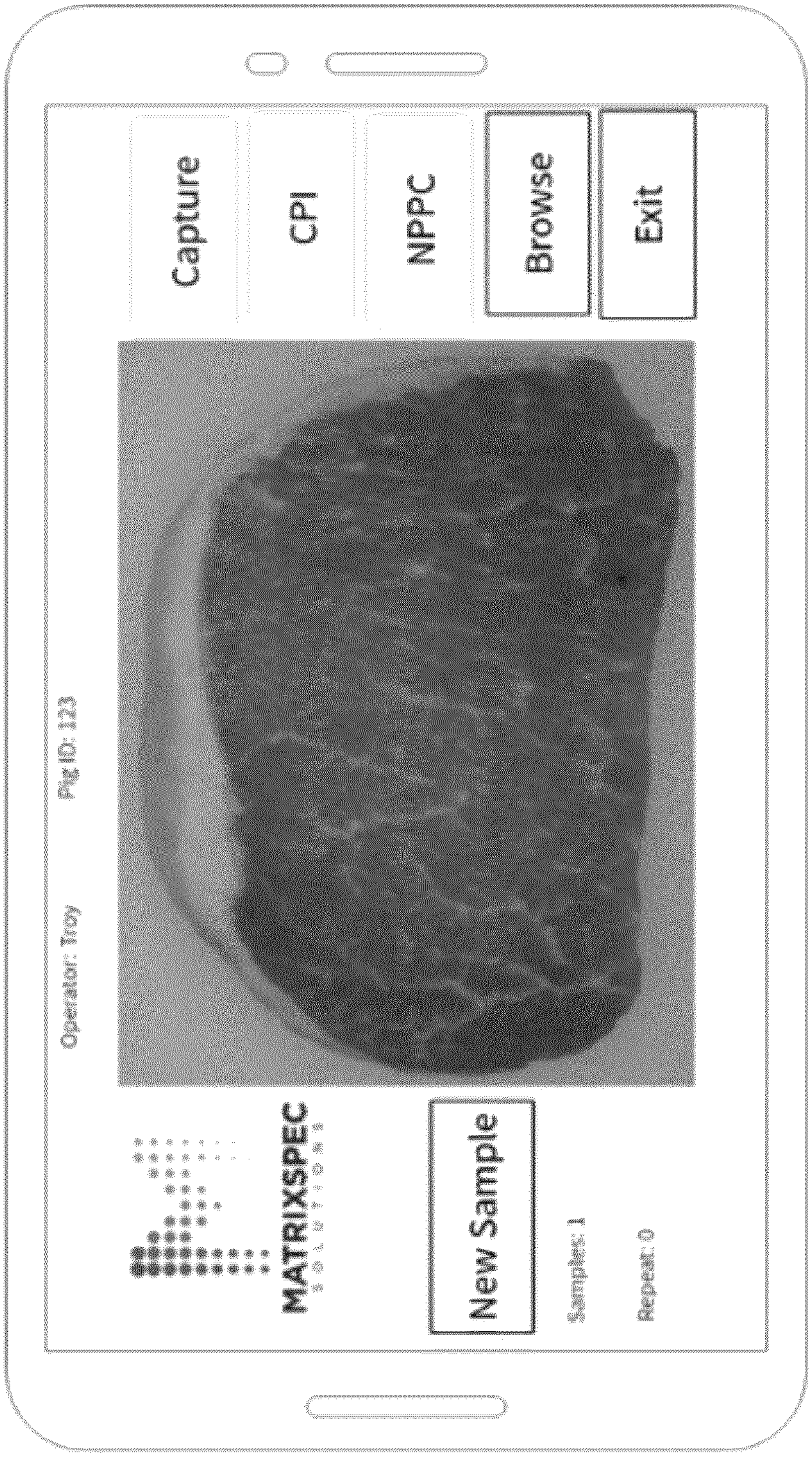

FIG. 21B illustrates an example of a main page 2120, in accordance with some embodiments. This screen displays after the user has given input to Operator and Pig ID field. Table 7 describes example function descriptions for fields on the main page.

TABLE 7

| Function description for Fields on Main Page | |
|---|---|
| Button/ Text Field | Description |
| New Sample | Pressing this button will let the system know that it's a new sample to be captured. |
| Capture | Pressing this button will capture the image. |
| CPI | Calculates the CPI score of the captured image. |
| NPPC | Calculates the NPPC score of the captured image. |
| Browse | This button will let you browse through the captured images. |
| Exit | This button exits the app. |

Figure 21C:
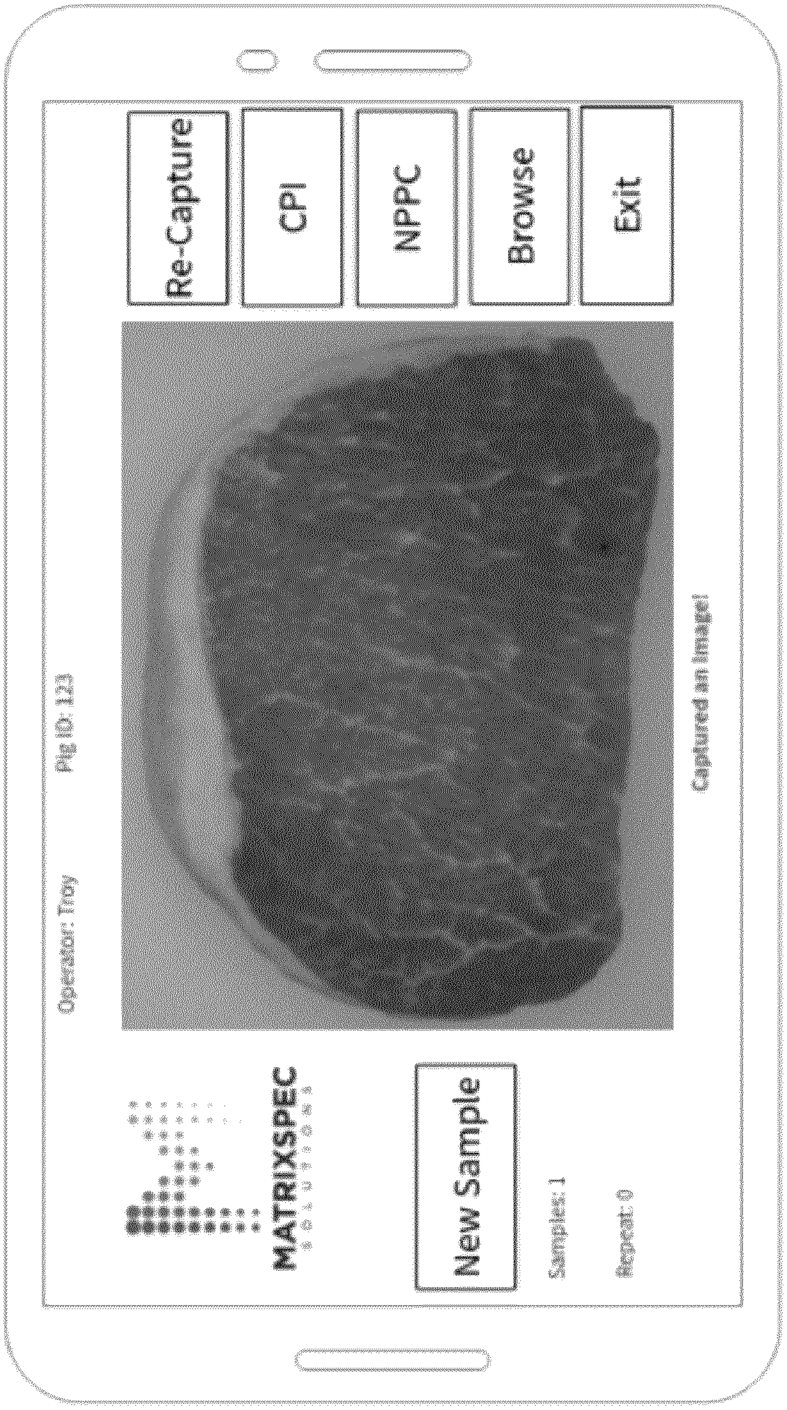

FIG. 21C illustrates an example of a re-capture page 2130, in accordance with some embodiments. This screen appears after an image has been captured. Table 8 describes example function description for fields on the re-capture page.

TABLE 8

| Function description for Fields on Re-Capture Page | |
|---|---|
| Button/ Text Field | Description |
| Re-Capture | Capture another image for the same pork sample. |

Figure 21D:
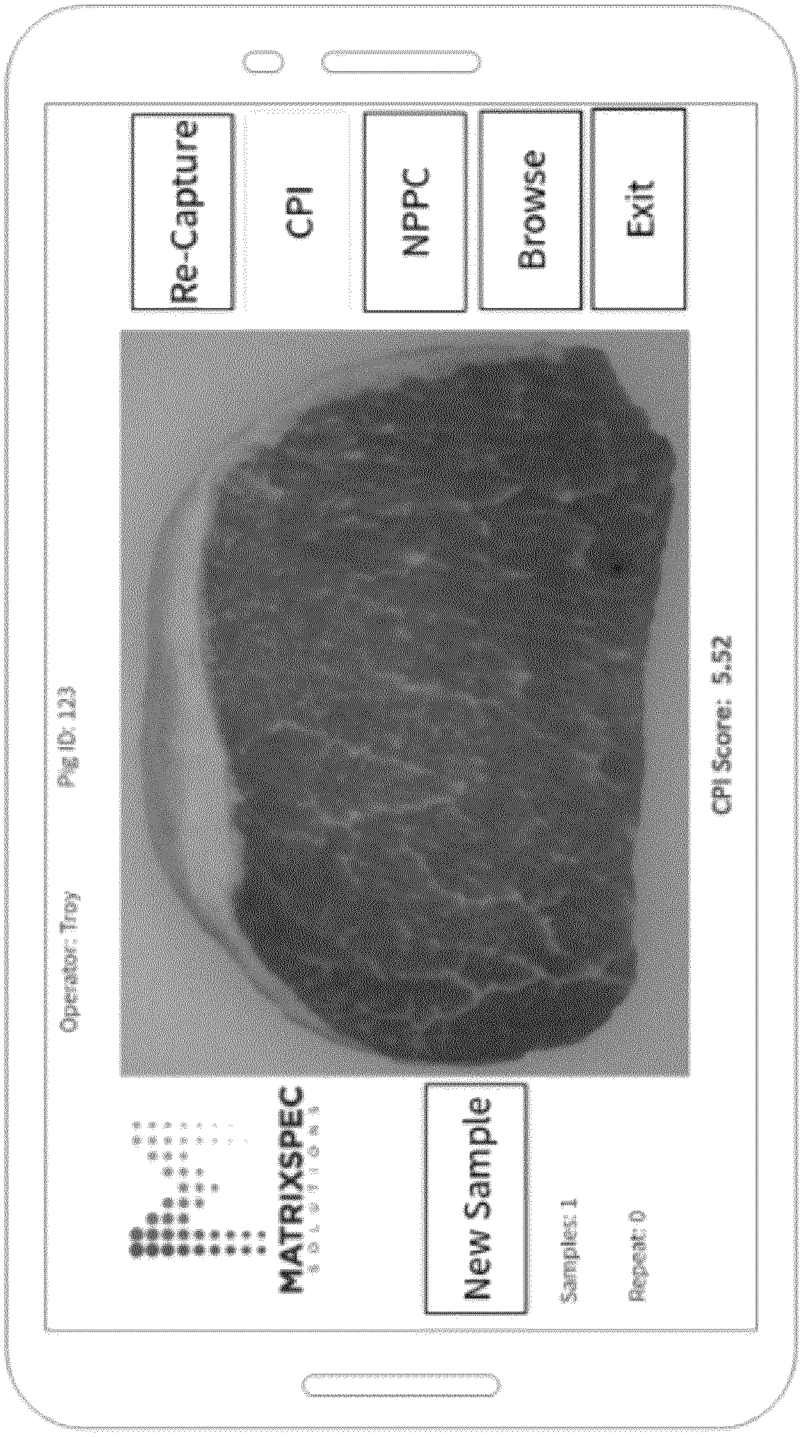

FIG. 21D illustrates an example of an application main page showing a predicted CPI score 2140, in accordance with some embodiments.

Figure 21E:
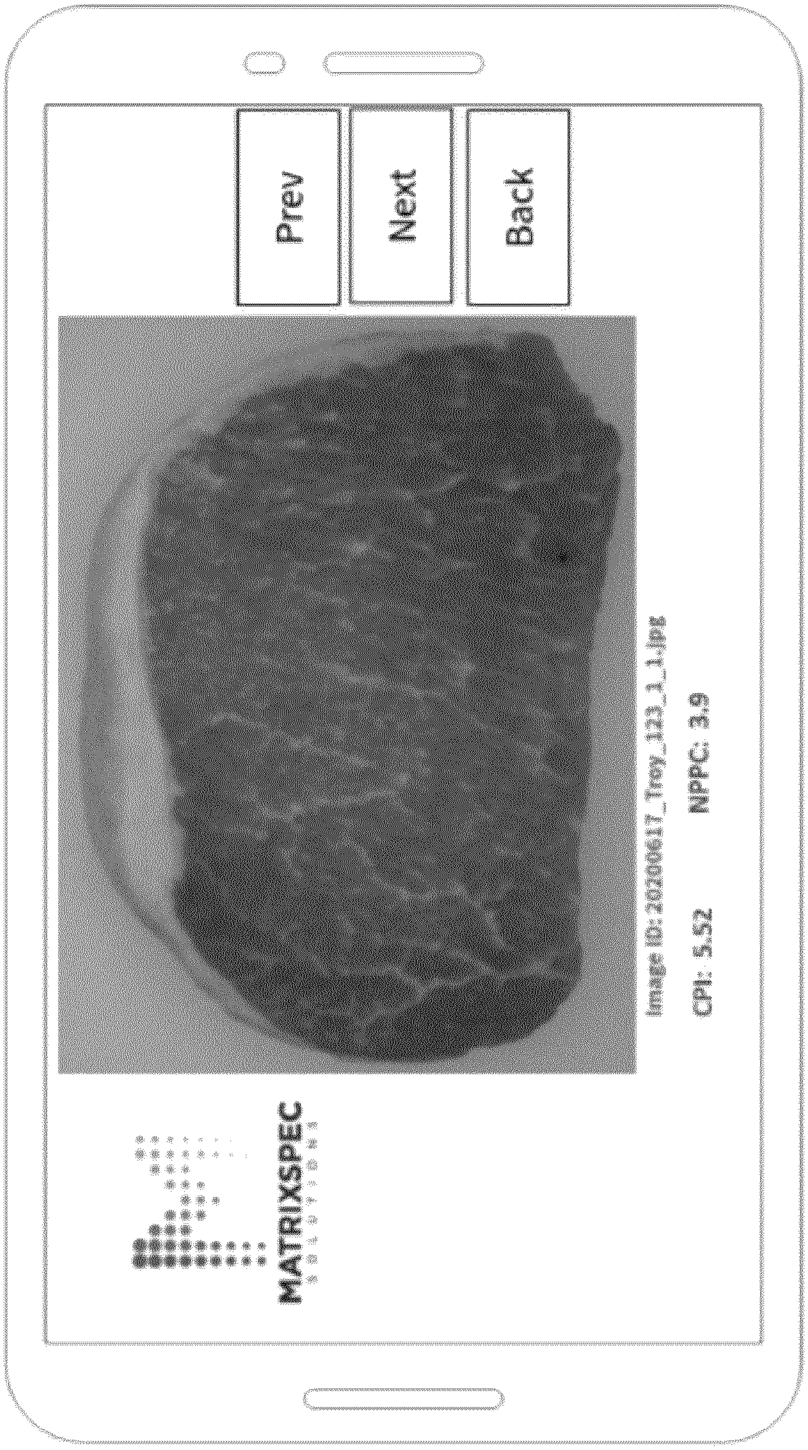

FIG. 21E illustrates an example of a browse page 2150, in accordance with some embodiments. This screen appears in response to a user pressing the Browse button. Table 9 describes example function description for fields on the browse page.

TABLE 9

| Function description for Fields on Browse Page | |
|---|---|
| Button/ Text Field | Description |
| Prev | Renders the previous image. |
| Next | Renders the next image. |
| Back | Returns to the Main Page. |

Figure 22:
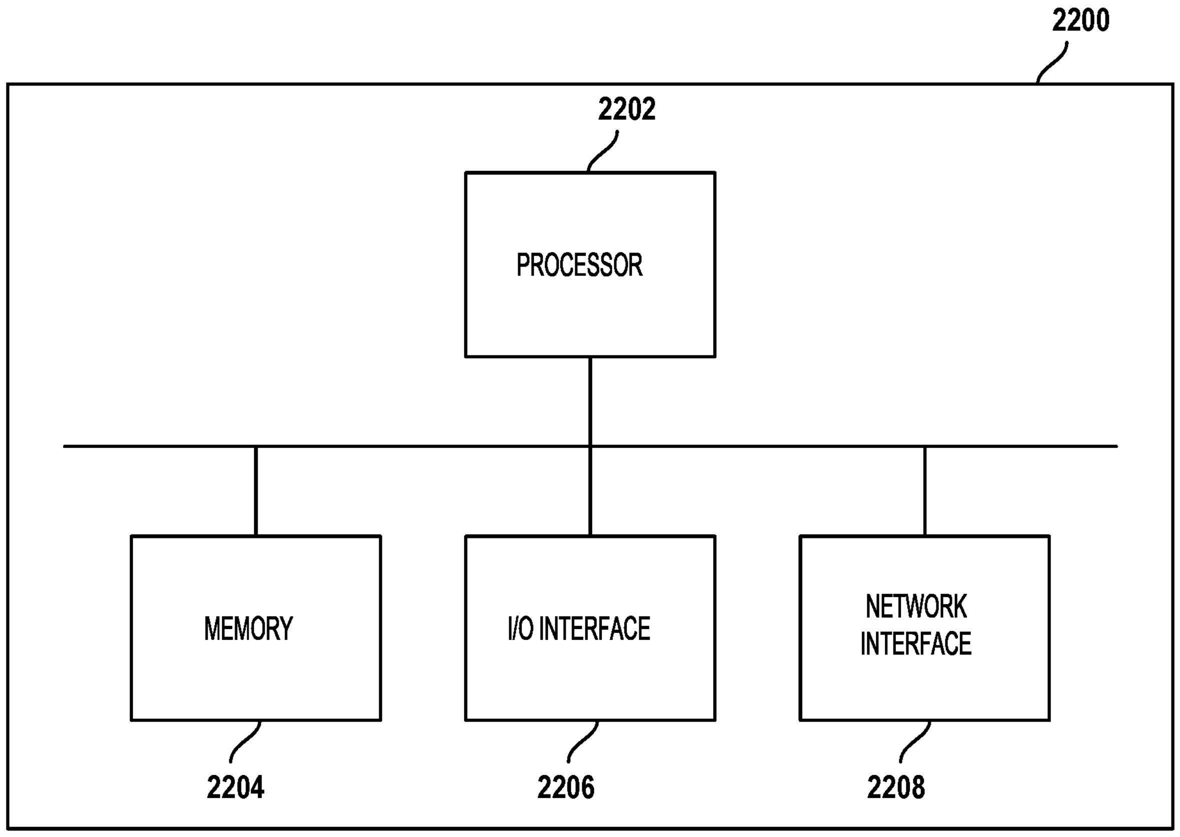
FIG. 22 is a schematic diagram of a computing device such as a server.

FIG. 22 is a schematic diagram of a computing device 2200 such as a server. As depicted, the computing device includes at least one processor 2202, memory 2204, at least one I/O interface 2206, and at least one network interface 2208.

Processor 2202 may be an Intel or AMD x86 or x64, PowerPC, ARM processor, or the like. Memory 2204 may include a suitable combination of computer memory that is located either internally or externally such as, for example, random-access memory (RAM), read-only memory (ROM), compact disc read-only memory (CDROM).

Each I/O interface 2206 enables computing device 2200 to interconnect with one or more input devices, such as a keyboard, mouse, camera, touch screen and a microphone, or with one or more output devices such as a display screen and a speaker.

Each network interface 2208 enables computing device 2200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

The foregoing discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for assessing a marbling of a meat sample, the system comprising:
- at least one processor;
- an output device; and
- a memory comprising instructions which, when executed by the processor, configure the processor to:
  - obtain a digital image of the meat sample, wherein the meat sample is one of a chop, a slice, a steak, or a whole loin;
  - analyze the digital image to identify a muscle of interest (MOI) of the meat sample when two or more muscles are present, said analyzing comprising:
    - segmenting image regions associated with the two or more muscles by applying a dynamic image segmentation method that automatically selects one or more image segmentation techniques based on a digital image quality appearance of the meat sample in the digital image, wherein at least one of the image segmentation techniques comprises a machine learning technique,
      - wherein the two or more muscles do not include intermuscular fat layers;
    - determining an area of each of the two or more muscles in each of the associated image regions segmented; and
    - selecting the MOI based on the determined areas;
  - segment an area of interest (AOI) in the MOI, the AOI in the MOI comprising a region of interest (ROI) of the image;
  - detect a number of marbling pixels in the ROI of the image; and
  - assessing the marbling of the meat sample by determining a marbling score based on a ratio of the number of marbling pixels and the total number of pixels in the ROI of the image; and
  - outputting, on the output device, the marbling score.

2. The system as claimed in claim 1, wherein the at least one processor is configured to determine the marbling score based on a ratio of marbling pixels and a distribution of marbling pixels.

3. The system as claimed in claim 1, wherein to segment the ROI of the image the at least one processor is configured to:
- generate a masking overlay for the ROI of the image.

4. The system as claimed in claim 3, wherein at least one of:
- the masking overlay causes the ROI to not include at least one of a fat layer or an outer muscle; or
- the masking overlay causes the ROI to include a water reflection area.

5. The system as claimed in claim 3, wherein to generate the masking overlay the at least one processor is configured to:
- determine a color for each pixel in the image;
- for each pixel in the image having a color inside of a range, set that pixel to "on"; and
- for each pixel in the image having a color outside of a range, set that pixel to "off".

6. The system as claimed in claim 3, wherein to generate the masking overlay the at least one processor is configured to:
- determine a plurality of sub-regions of the image based on pixels having similar color to adjacent pixels; and
- determine sub-regions that belong together as the ROI.

7. The system as claimed in claim 1, wherein to segment the ROI of the image the at least one processor is configured to at least one of:
- shrink the ROI of the image by removing a number of pixels from the ROI that are furthest from a centroid of the ROI; or
- determine a plurality of sub-regions of the image based on pixels having similar color to adjacent pixels, wherein for each sub-region, one of:
  - for each pixel in that sub-region having a color outside of a range, set that pixel to "off"; or
  - determine that that sub-region belongs to another sub-region in the ROI.

8. The system as claimed in claim 1, wherein the at least one processor is configured to:
- shrink the ROI of the image by removing a number of pixels from the ROI that are furthest from a centroid of the ROI;
- determine a contour of the ROI using the ROI segmented image;
- determine a centroid of the contour; and
- move every pixel on the contour towards to the centroid a predefined distance.

9. The system as claimed in claim 1, wherein to determine the number of marbling pixels in the ROI of the image the at least one processor is configured to:
- apply a ring filter to a group of pixels;
- for each pixel in the group of pixels, determine a similarity value between that pixel and a centre pixel; and
- assign the pixels outside a threshold range as marbling.

10. A computer-implemented method of assessing a marbling of a meat sample, the method comprising:
- obtaining a digital image of the meat sample, wherein the meat sample is one of a chop, a slice, a steak, or a whole loin;
- analyzing the digital image to identify a muscle of interest (MOI) of the meat sample when two or more muscles are present, said analyzing comprising:
  - segmenting image regions associated with two or more muscles by applying a dynamic image segmentation method that automatically selects one or more image segmentation techniques based on a digital image quality appearance of the meat sample in the digital image, wherein at least one of the image segmentation techniques comprises a machine learning technique, wherein the two or more muscles do not include intermuscular fat layers;

determining an area of each of the two or more muscles in each of the image regions segmented; and select the MOI based on the determined areas;

segmenting an area of interest (AOI) in the MOI, the AOI in the MOI comprising a region of interest (ROI) of the image;

detecting a number of marbling pixels in the ROI of the image;

assessing the marbling of the meat sample by determining a marbling score comprising a ratio of the number of marbling pixels and the total number of pixels in the ROI of the image; and outputting, on an output device, the marbling score.

11. The method as claimed in claim 10, wherein the marbling score is determined based on a ratio of marbling pixels and a distribution of marbling pixels.

12. The method as claimed in claim 10, wherein segmenting the ROI of the image comprises:

generating a masking overlay for the ROI of the image.

13. The method as claimed in claim 12, wherein at least one of:

the masking overlay causes the ROI to not include at least one of a fat layer or an outer muscle; or the masking overlay causes the ROI to include a water reflection area.

14. The method as claimed in claim 12, wherein generating the masking overlay comprises:

determining a color for each pixel in the image;

for each pixel in the image having a color inside of a range, setting that pixel to "on"; and for each pixel in the image having a color outside of a range, setting that pixel to "off".

15. The method as claimed in claim 12, wherein generating the masking overlay comprises:

determining a plurality of sub-regions of the image based on pixels having similar color to adjacent pixels; and determining sub-regions that belong together as the ROI.

16. The method as claimed in claim 10, wherein segmenting the ROI of the image comprises at least one of:

shrinking the ROI of the image by removing a number of pixels from the ROI that are furthest from a centroid of the ROI; or determining a plurality of sub-regions of the image based on pixels having similar color to adjacent pixels, wherein for each sub-region, one of:

for each pixel in that sub-region having a color outside of a range, setting that pixel to "off"; or determining that that sub-region belongs to another sub-region in the ROI.

17. The method as claimed in claim 10, comprising:

shrinking the ROI of the image by removing a number of pixels from the ROI that are furthest from a centroid of the ROI, determining a contour of the ROI using the ROI segmented image;

determining a centroid of the contour; and moving every pixel on the contour towards to the centroid a predefined distance.

18. The method as claimed in claim 10, wherein determining the number of marbling pixels in the ROI of the image comprises:

applying a ring filter to a group of pixels;

for each pixel in the group of pixels, determining a similarity value between that pixel and a centre pixel; and assigning the pixels outside a threshold range as marbling.

19. The system as claimed in claim 1, wherein, in applying the dynamic image segmentation method, the processor is further configured to:

apply a threshold for a first muscle in the two or more muscles;

apply a clustering-based segment at for a second muscle in the two or more muscles; and apply one of threshold, cluster-based, active contour, graph cut, region-based segmentation, regression model and morphological operations for each of any other muscles in the two or more muscles.

20. The method as claimed in claim 10, wherein, in applying the dynamic image segmentation method, the method further comprises:

applying thresholding for a first muscle in the two or more muscles;

applying clustering-based segmentation for a second muscle in the two or more muscles; and applying one of thresholding, clustering-based, active contour, graph cut, region-based segmentation, regression model and morphological operations for each of any other muscles in the two or more muscles.

* * * * *